United States Patent [19]
Kato et al.

[11] Patent Number: 5,717,509
[45] Date of Patent: Feb. 10, 1998

[54] STEREOSCOPIC DISPLAY METHOD OF HOLOGRAM AND ITS FORMING METHOD AND ITS STEREOSCOPIC DISPLAY APPARATUS

[75] Inventors: Masayuki Kato; Hirokazu Aritake; Manabu Ishimoto; Noriko Sato; Masato Nakashima, all of Kawasaki, Japan

[73] Assignee: Fujitsu Limited, Kawasaki, Japan

[21] Appl. No.: 668,368

[22] Filed: Jun. 18, 1996

Related U.S. Application Data

[60] Continuation of Ser. No. 411,337, Mar. 27, 1995, abandoned, which is a division of Ser. No. 104,622, Aug. 11, 1993, abandoned.

[30] Foreign Application Priority Data

Aug. 21, 1993 [JP] Japan ................... 222 588

[51] Int. Cl.$^6$ ................... G03H 1/08
[52] U.S. Cl. ................... 359/9; 359/22; 359/23; 359/900
[58] Field of Search ................... 359/10, 11, 22, 359/23, 24, 25, 9, 900; 364/525; 395/119

[56] References Cited

U.S. PATENT DOCUMENTS

| | | | |
|---|---|---|---|
| 3,614,426 | 10/1971 | Donzelle | 378/23 |
| 3,788,726 | 1/1974 | Groh et al. | 359/23 |
| 3,832,027 | 8/1974 | King | 359/23 |
| 3,843,225 | 10/1974 | Kock et al. | 359/23 |

(List continued on next page.)

FOREIGN PATENT DOCUMENTS 35 06 368  9/1986  Germany.
2 140 170  11/1984  United Kingdom.

OTHER PUBLICATIONS

G. Zhou, "Three–Dimensional Holographic Reconstruction of Two–Dimensional Image Information from Serial Sections and Its Applications in Biomedicine", Optics & Laser Tech., vol. 17, No. 1, Feb. 1985, pp. 23–26.
N. Kovtonyuk, et al., "Generation of a Three–Dimensional Image and Holography of Noncompact Objects", Soviet Physics: Doklady, vol. 34, No. 5, May 1989, pp. 473–475.
S. Hart, et al., "Display Holography for Medical Tomography", Proceedings of the SPIE, vol. 1212, 1990, pp. 116–135.

(List continued on next page.)

*Primary Examiner*—Thong Nguyen
*Assistant Examiner*—John Juba, Jr.

[57] ABSTRACT

A hologram of a virtual object or an object which actually exists is formed and a solid image is displayed. 3-dimensional information of the object to be displayed is divided into regions in the depth direction. Depth images are formed as 2-dimensional images where are seen from a plurality of points which are obtained by finely dividing the hologram forming surface for every region. A phase distribution at the hologram forming surface is calculated from the depth images and displayed on a liquid crystal display or the like as an electronic hologram. A reference light is irradiated onto the display and is converted into an optical wave front, thereby displaying a solid image. When forming a hologram recording medium, a zone image corresponding to each of the finely divided exposure regions of a dry plate is exposed multiple times.

14 Claims, 32 Drawing Sheets

U.S. PATENT DOCUMENTS

| | | | |
|---|---|---|---|
| 4,109,996 | 8/1978 | Ersoy | 359/9 |
| 4,421,380 | 12/1983 | McGrew | 359/23 |
| 4,669,812 | 6/1987 | Hoebing | 359/9 |
| 4,778,262 | 10/1988 | Haines | 359/9 |
| 4,834,476 | 5/1989 | Benton | 359/23 |
| 4,964,684 | 10/1990 | Iovine | 359/23 |
| 5,022,727 | 6/1991 | Smith et al. | 359/23 |
| 5,117,296 | 5/1992 | Hoebing | 359/21 |
| 5,138,471 | 8/1992 | McGrew | 359/21 |
| 5,216,528 | 6/1993 | Honda et al. | 359/23 |
| 5,237,433 | 8/1993 | Haines et al. | 359/9 |
| 5,347,375 | 9/1994 | Saito et al. | 359/9 |

OTHER PUBLICATIONS

Y. Ichioka, et al., "Scanning Halftone Plotter and Computer–Generated Continuous Tone Hologram", Applied Optics, vol. 10, No. 2, Feb. 1971, pp. 403–411.

Y. Denisyuk, "Aspectograms and Composite Holograms", Soviet Physics Technical Physics, vol. 20, No. 12, Dec. 1975, pp. 1601–1610.

T. Yatagi, "Stereoscopic Approach to 3–D Display Using Computer–Generated Holograms", Applied Optics, vol. 15, No. 11, Nov. 1976, pp. 2722–2729.

A. Busquets, et al., "Depth–Viewing–Volume Increase by Collimation of Stereo 3–D Displays", IEEE Proceedings, vol. 2, Apr. 1990, pp. 589–592.

P. McOwan, et al., "Three–Dimensional Stereoscopic Display Using Ray Traced Computer Generated Holograms", Optics Communications, vol. 82, No. 1/2, Apr. 1991, pp. 590–592.

MOVE TO NEAR POSITION    STANDARD    MOVE TO FAR POSITION

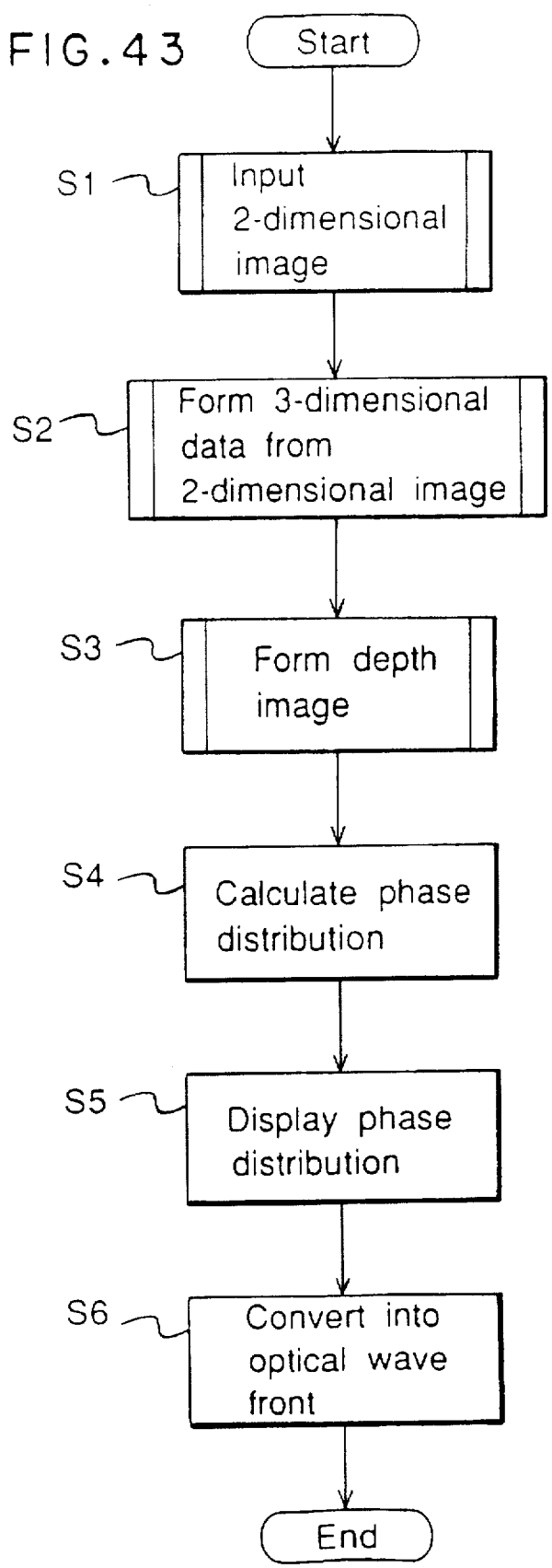

STEREOSCOPIC DISPLAY METHOD OF HOLOGRAM AND ITS FORMING METHOD AND ITS STEREOSCOPIC DISPLAY APPARATUS

REFERENCE

This application is a continuation of application Ser. No. 08/411,337, filed Mar. 27, 1995, now abandoned which is a division of application Ser. No. 08/104,622, filed Aug. 11, 1993, now abandoned.

BACKGROUND OF THE INVENTION

The present invention relates to a stereoscopic display method, a forming method, and a stereoscopic display apparatus of a hologram for performing a stereoscopic display by forming a hologram of a virtual object or an object which actually exists and, more particularly, to a stereoscopic display method, a forming method, and a stereoscopic display apparatus of a hologram for performing a natural stereoscopic display by using a 2-dimensional image.

A stereoscopic display is a display for enabling a depth or a thickness of a 3-dimensional object to be easily visually understood. Such a stereoscopic display is strongly demanded in a display of a structural object designed by a CAD or the like, a display of a medical image, or the like. On the other hand, a solid image is more impressive as compared with a 2-dimensional display and is also used in a display for amusement in an amusement park, a movie, or the like.

Hitherto, with respect to the stereoscopic display, various kinds of methods have already been proposed. There is a hologram as means in which an observer can see a solid image without using special glasses. The hologram is a special image in which an object image was recorded by using an interference operation of the light. With regard to a still object, a color hologram having a depth feeling has already been produced. On the other hand, as a method whereby a virtual object having a 3-dimensional structure formed by the CAD or the like is stereoscopically seen, there is a computer graphics (CG). The computer graphics is a technique in which a 2-dimensional image, when an object is seen from a predetermined direction, is calculated and is really expressed in consideration of the reflection or shadow of the light. Since the computer graphics, however, intends to obtain a -dimensional image, a stereoscopic feeling is insufficient. It is possible to display, with a stereoscopic feeling, by a holographic stereogram system such that 2-dimensional images, when an object is seen from various directions, are sequentially recorded into stripe-like regions, each having a microwidth in the horizontal direction and a width of screen in the vertical direction, by the holographic exposure on the basis of the 2-dimensional image by the computer graphics.

According to the conventional holographic stereogram, however, a 2-dimensional image is fundamentally seen and the surface at which a focal point of the eyes is located doesn't coincide with the position of the image which is observed by a parallax of both eyes. Therefore, it is hard to see and such a state results in a cause of a fatigue. Particularly, in a case of displaying an image of a deep depth, a burden on the eyes increases and such a stereoscopic display is unpreferable. The conventional hologram is recorded onto a film-like medium and it takes a time to develop the image, so that it is inconvenient as a stereoscopic display system. Further, the display contents cannot be rewritten.

SUMMARY OF THE INVENTION

According to the invention, there is provided a stereoscopic display method and a stereoscopic display apparatus of a hologram, in which a natural stereoscopic display can be performed on the basis of a 2-dimensional image and, even when the image is observed for a long time, a fatigue is small and the image can be rewritten n a real-time manner.

A stereoscopic display method of a hologram according to the invention include a 3-dimensional information forming step of forming 3-dimensional information of an object to be displayed by a CAD or the like; a depth image forming step of forming a plurality of depth images obtained by converting the 3-dimensional information into the 2-dimensional information; a phase distribution calculating step of calculating a phase distribution at a hologram forming surface from the plurality of depth images formed by the depth image forming step; a hologram expressing step of expressing the phase distribution obtained by the phase distribution calculating step onto the hologram forming surface; and a wave front converting step of displaying a solid image by irradiating a reference light to the phase distribution expressed by the hologram expressing step and by converting into an optical wave front, such that the 3-dimensional information can be also formed from input data of a 2-dimensional image obtained by photographing an object by a CCD camera or the like.

According to the invention, there is provided a hologram forming method of forming a hologram medium by multiple exposure of a plurality of 2-dimensional images obtained by being divided in the depth direction. The invention also includes a method of forming a recording medium of a hologram by multiple exposure based on the depth images formed. A hologram can be also produced from input data of the 2-dimensional image obtained by photographing an object.

When the depth images are formed, 3-dimensional information to be expressed is divided in the depth direction, a plurality of 3-dimensional regions are set, region data indicative of the 3-dimensional information of the object to be displayed is formed every region, and a plurality of depth image data comprising the 2-dimensional image data is formed every region. When the region in the depth direction is set, such a region can be separated, every object to be expressed or one object can be also divided into a plurality of portions. As depth data, a 2-dimensional plane which is parallel with the hologram forming surface is set in each region and projection data of an object or objects when it/they are seen from the hologram forming surface is produced as 2-dimensional image data onto the 2-dimensional plane. When the phase distribution is calculated, with respect to each of the segment holograms as minimum units obtained by dividing the hologram forming surfaces into small portions, the phase is calculated on the basis of the 2-dimensional pixels constructing the depth image, forming a phase distribution at the hologram forming surface. The phase distributions obtained every plurality of depth images are added every segment holograms at the same position, thereby obtaining a phase distribution at the hologram forming surface of a synthesized depth image.

According to the invention as mentioned above, a space phase distribution of the hologram is calculated from a plurality of 2-dimensional depth images and the phase distribution obtained is expressed by means for spatially modulating an amplitude or a phase of a reference light (reproduction light), and a rewritable stereoscopic display can be performed by an optical wave front conversion by the irradiation of the reference light. When a recording medium of the hologram is formed, a plurality of depth images are multiplexingly recorded by the light interference exposure, thereby forming the segment hologram. The segment holograms obtained are arranged and recorded on a hologram dry plate, so that a hologram recording medium can be formed. An ordinary hologram display can be performed by using such a recording medium. The gradation display in the depth direction of the 2-dimensional image is executed by the stereoscopic display using the phase distribution or hologram recording medium formed from the plurality of 2-dimensional depth images. A difference between the distance perceived of the stereoscopic display image which is observed by the parallax of both eyes and the distance perceived which is sensed by a focus adjusting function of the eyes is reduced. The fatigue which is sensed when a solid image is seen is decreased. A natural solid perceived can be obtained.

The above and other objects, features, and advantages of the present invention will become more apparent from the following detailed description of the invention with reference to the drawings.

BRIEF DESCRIPTION OF THE DRAWINGS

FIG. 6 is seen from the side;

FIG. 8 is seen from the side;

FIG. 43 is a flowchart showing a fundamental processing procedure of a stereoscopic display method of the invention to perform a stereoscopic display in which 3-dimensional data is formed from 2-dimensional data obtained by photographing an object;

DETAILED DESCRIPTION OF THE PREFERRED EMBODIMENT

Fundamental Construction of Stereoscopic Display Method

Figure 1:
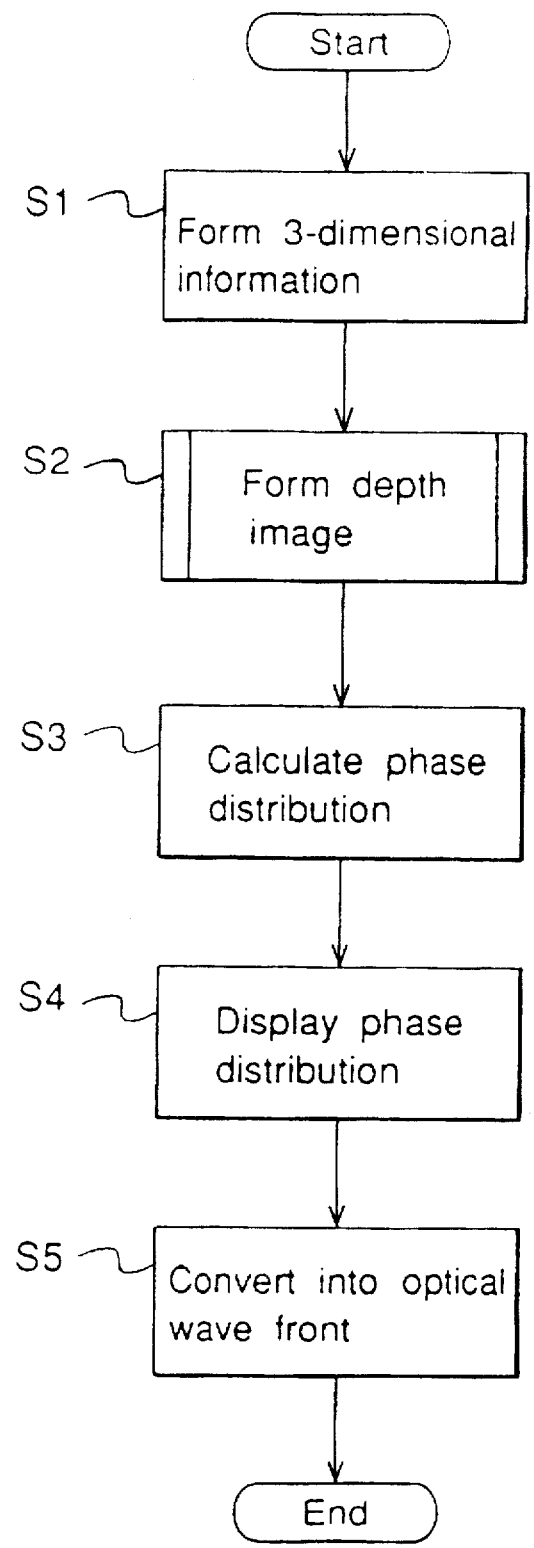
FIG. 1 is a flowchart showing a fundamental processing procedure of a stereoscopic display method according to the invention.

A flowchart of FIG. 1 shows a fundamental processing procedure of a stereoscopic display method of a program according to the invention. First, in step S1, 3-dimensional information of an object or objects to be displayed is formed. The 3-dimensional information is formed either from the 3-dimensional image data by a CAD system or the 2-dimensional data obtained by photographing an object by a CCD camera or the like. In step S2, a plurality of depth images obtained by converting from the 3-dimensional information into the 2-dimensional information are formed. To produce the depth images, an object to be displayed is seen from a hologram forming surface and is divided into a plurality of zones in the depth direction, and the image data, projected to a 2-dimensional plane that is parallel with the hologram forming surface set in each zone, is formed. In step S3, a phase distribution at the hologram forming surface is calculated from a plurality of depth images. In steps S4 and S5, the calculated phase distribution is expressed on the hologram forming surface, a reference light is finally irradiated, and a solid image is displayed by the optical wave front conversion according to the phase distribution.

Figure 2:
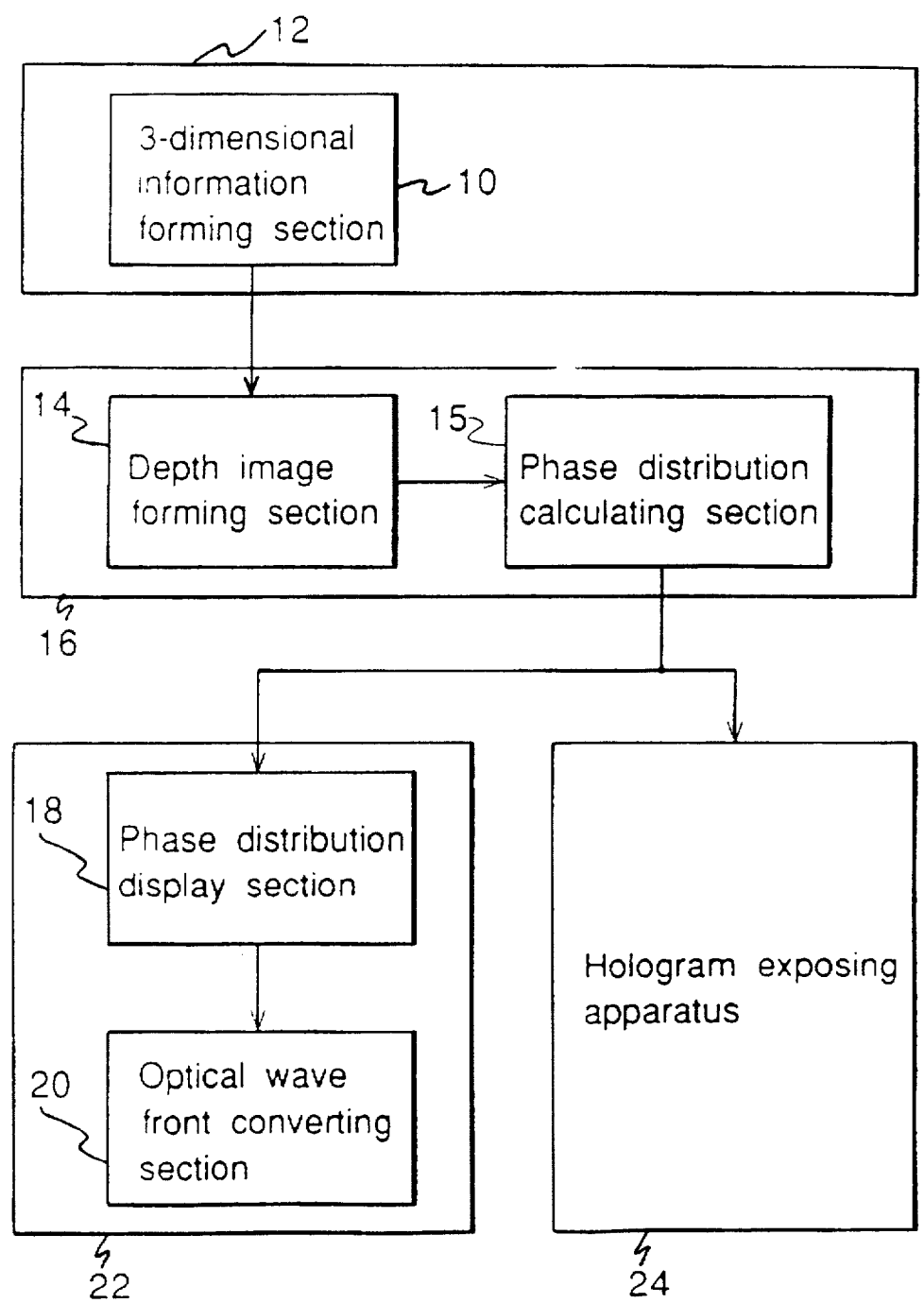
FIG. 2 is a block diagram showing a fundamental construction of an apparatus of the invention.

FIG. 2 shows a fundamental construction of an apparatus to realize the stereoscopic display method of FIG. 1. A 3-dimensional information forming section 10 is realized by, for example, a CAD system 12. The 3-dimensional information of the object to be displayed, which was formed by the 3-dimensional information forming section 10, is given to a depth image forming section 14, thereby forming a plurality of 2-dimensional images divided in the depth direction. The images formed by the depth image forming section 14 are given to a phase distribution calculating section 15 and a phase distribution at the hologram forming surface is calculated. The depth image forming section 14 and the phase distribution calculating section 15 are realized by a computer 16. The result of the calculation of the phase distribution calculating section 15 is given to a phase distribution display section 18. A solid image is displayed by an optical wave front converting section 20. The phase distribution display section 18 and the optical wave front converting section 20 are included in a hologram display apparatus 22. On the other hand, a plurality of 2-dimensional image data in the depth direction, formed by the depth image forming section 14, are given to a hologram exposing apparatus 24 and are recorded onto a hologram dry plate as a recording medium by the multiple exposure, so that a hologram as a fixed record can be formed. Each processing step in FIG. 1 will now be described in detail hereinbelow.

Formation of 3-Dimensional Information

Figure 3:
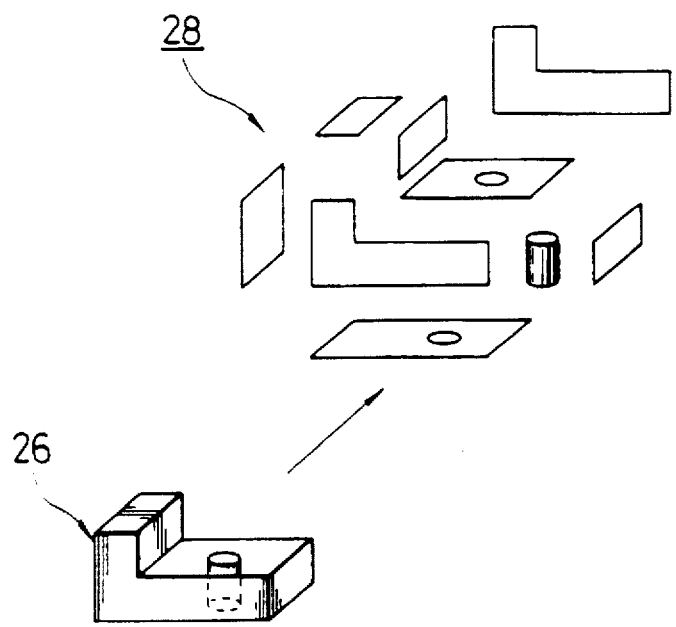
FIG. 3 is an explanatory diagram of an expressing format of 3-dimensional structural data in a CAD system.
Figure 4:
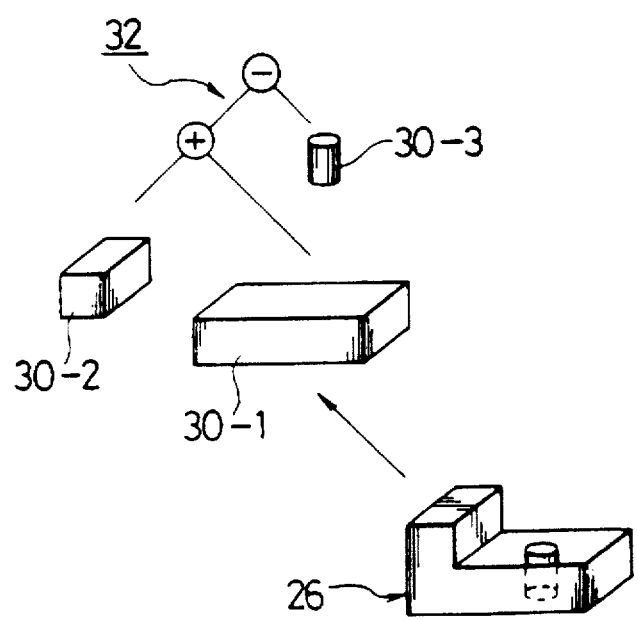
FIG. 4 is an explanatory diagram of another expressing format of 3-dimensional structural data in the CAD system.

In the formation of the 3-dimensional information of an object to be stereoscopically displayed, for example, an expressing format of 3-dimensional data in the computer graphics can be used. For instance, in a case of describing a 3-dimensional structure by a solid model, an object 26 having a 3-dimensional structure is separated into a set of planes 28 as shown in FIG. 3. Lists of contours or vertexes of the planes are linked, thereby forming 3-dimensional data. As shown in FIG. 4, the object 26 is expressed by a set of fundamental FIGS. 30-1, 30-2, and 30-3. The object 26 is expressed by using logic arithmetic operating expressions 32 of the fundamental FIGS. 30-1 to 30-3. Such expressing formats of the 3-dimensional data shown in FIGS. 3 and 4 are widely used in the field of the computer graphics. For example, the 3-dimensional data which is used in the invention can be produced from the CAD data by using the CAD system as shown in FIG. 2.

Formation of Depth Images

Figure 5:
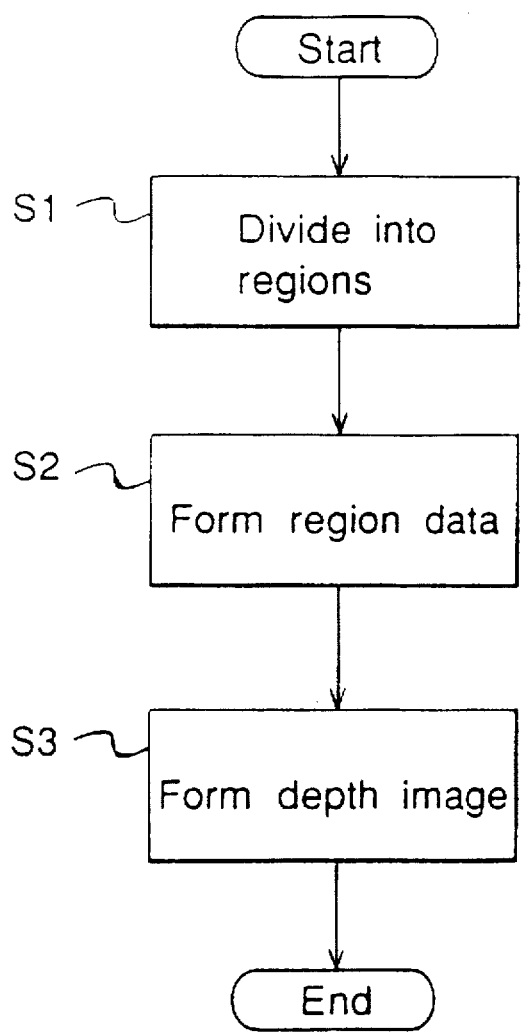
FIG. 5 is a flowchart showing the details of the depth image forming procedure in FIG. 1.

A flowchart of FIG. 5 shows a step of forming depth images in the invention. In step S1, the 3-dimensional data is divided into a plurality of regions (zones) in the depth direction. In step S2, 3-dimensional data is formed for every zone. Finally, in step S3, 2-dimensional depth image data is formed for every zone.

Figure 6:
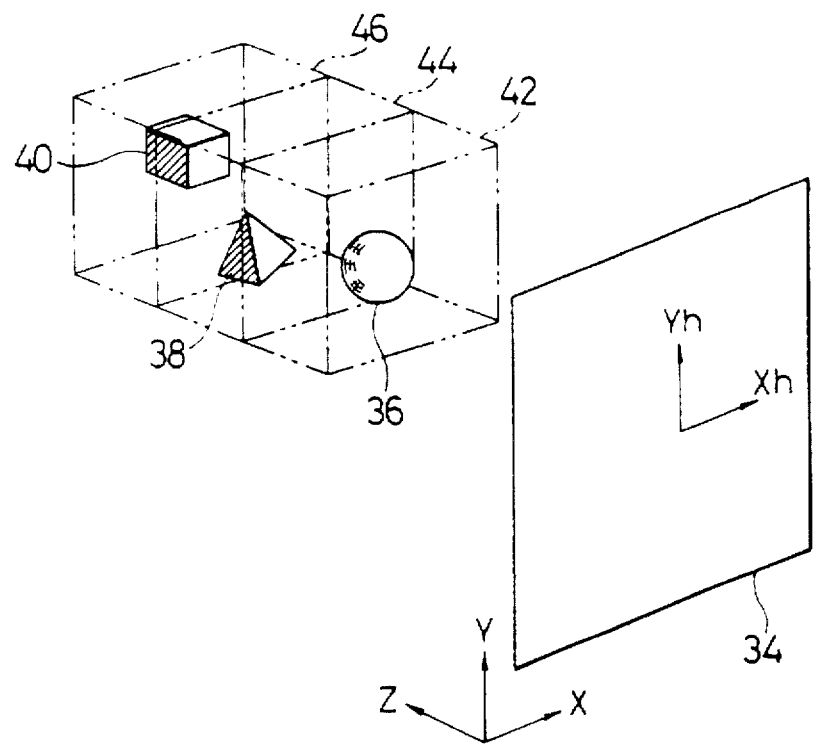
FIG. 6 is an explanatory diagram of the division of a region in the depth direction in the invention.

The depth division of the 3-dimensional data will be first explained. FIG. 6 shows the depth division for a space in which three objects 36, 38, and 40, each having solid structures to be displayed according to the invention, are arranged in the depth direction. First, a hologram forming surface 34 is set at an arbitrary position for the objects 36, 38, and 40. Zones 42, 44, and 46 are set for the objects 36, 38, and 40 in the depth direction perpendicular to the hologram forming surface 34, respectively. As for coordinate axes in the object space, the lateral direction of the hologram forming surface 34 is set to an X axis, the vertical direction is set to a Y axis, and the depth direction is set to a Z axis. 2-dimensional coordinate system of independent 2-dimensional coordinates $X_h$ and $Y_h$ are set or the hologram forming surface 34.

Figure 7:
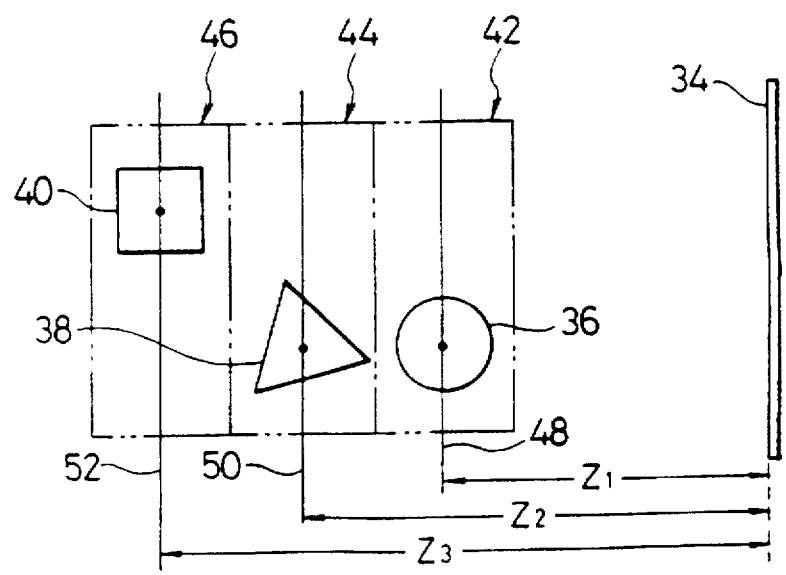
FIG. 7 is an explanatory diagram when

FIG. 7 shows a side elevational view of FIG. 6. The object 36 belongs to the nearest zone 42 from the hologram forming surface 34, the object 38 belongs to the next zone 44, and the object 40 belongs to the farthest zone 46. In the zone division, the case where each object could be divided into zones is shown. In general, however, and in many cases, objects overlap several zones located in the depth direction.

Figure 8:
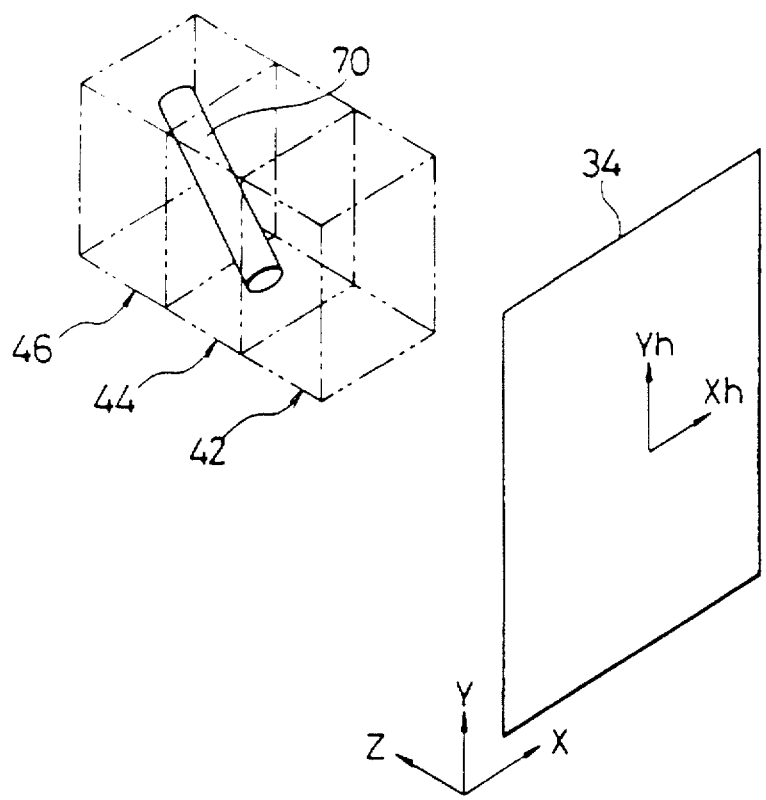
FIG. 8 is an explanatory diagram of the depth division of one object in the invention.

FIG. 8 shows the zone division in the case where one object 70 exists in the depth direction. In this case, the zones 42, 44, and 46 are decided so as to divide the object 70 into three zones in the depth direction.

Figure 9:
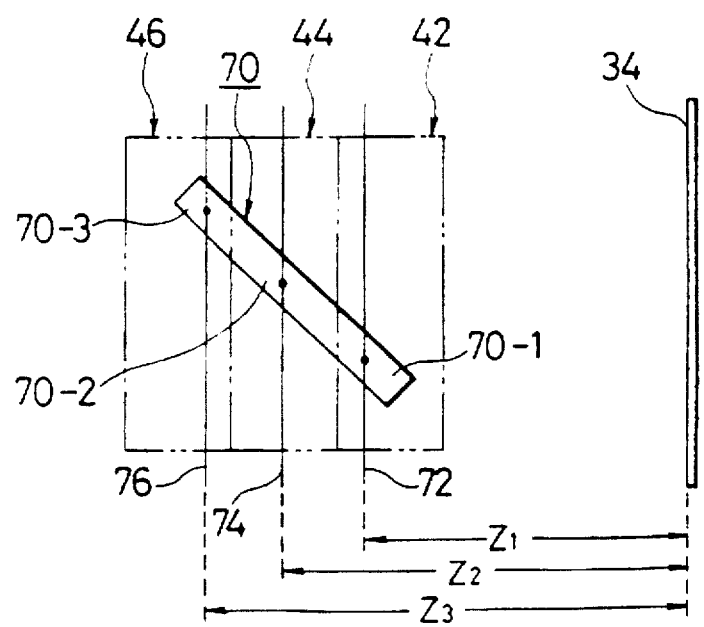
FIG. 9 is an explanatory diagram when

FIG. 9 shows the state of the zone division in FIG. 8 when it is seen from the side. When the zone divisions can be performed as shown in FIGS. 6 to 9, each 3-dimensional data is produced as zone data which expresses each zone. That is, in FIGS. 6 and 7, after completion of the zone division, the independent 3-dimensional data is obtained every object 36, 38, or 40. In FIGS. 8 and 9, after completion of the division, 3-dimensional data indicative for three divided cylindrical members 70-1, 70-2, and 70-3 are obtained.

Figure 10:
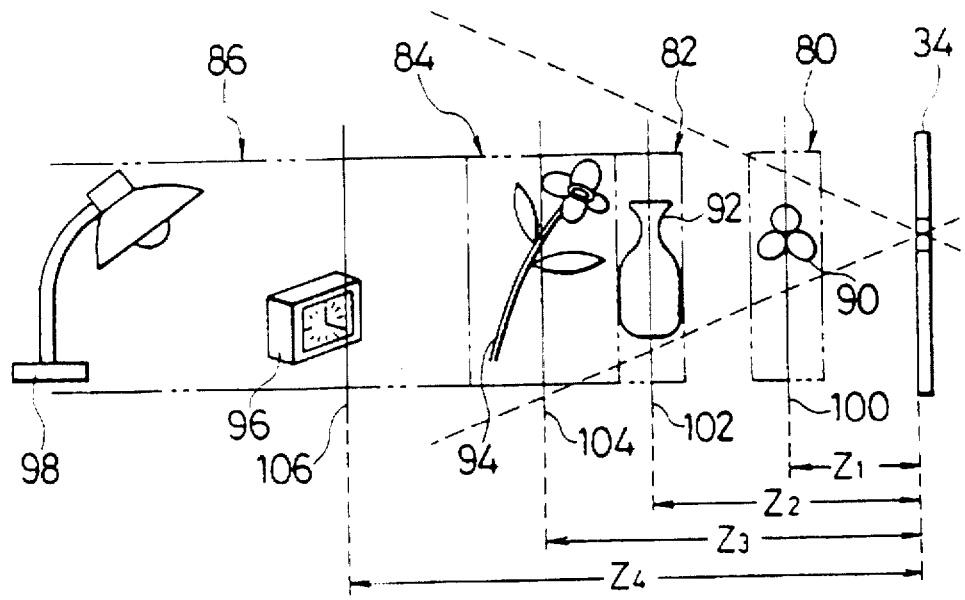
FIG. 10 is an explanatory diagram showing a general example of the depth division and the positions of 2-dimensional planes which are set in divided zones in the invention.

FIG. 10 shows the general depth division of 3-dimensional data. In this example, objects 90, 92, 94, 96, and 98 are arranged in the depth direction for the hologram forming surface 34. Among them, independent zones 80, 82, and 84 are set for the objects 90, 92, and 94, respectively. On the other hand, a single background zone 86 is set with respect to the objects 96 and 98 existing at positions which are away from the hologram forming surface 34 by predetermined distances or more.

The formation of the 2-dimensional depth images will now be described. When 3-dimensional data by the depth division is formed, 2-dimensional image data is formed for every zone. As to a 2-dimensional planes, form the 2-dimensional image data of each zone, in case of FIG. 7, 2-dimensional planes 48, 50, and 52 which are parallel to the hologram forming surface 34 and pass through the centers of gravity of the objects 36, 38, and 40 existing in the zones 42, 44, and 46 are set. A plurality of 2-dimensional image data of the projection images, when the objects are seen from different visual points on the hologram forming surface 34, are formed for every zone for each of the 2-dimensional planes 48, 50, and 52. In this instance, distances in the depth direction of the 2-dimensional planes 48, 50, and 52 from the hologram forming surface 34 are previously obtained as $Z_1$, $Z_2$, and $Z_3$, respectively. In case of FIG. 9 as well, 2-dimensional planes 72, 74, and 76 which are parallel with the hologram forming surface 34 and pass through the centers of gravity of cylindrical members 70-1, 70-2, and 70-3 which belong to the zones 42, 44, and 46 are similarly set. The distances $Z_1$, $Z_2$, and $Z_3$ in the depth direction are also previously obtained, respectively. With respect to the general zone division of FIG. 10 as well, having the zones 80, 82, and 84, 2-dimensional planes 100, 102, and 104 are similarly set to the positions of the centers of gravity of the distances $Z_1$, $Z_2$, and $Z_3$. With regard to the background zone 86, a 2-dimensional plane 106 is set at a distance $Z_4$ in the depth direction that is farthest from the hologram forming surface 34. The 2-dimensional image data of all of the objects 96 and 98, which are seen in the background zone 86 are formed on the 2-dimensional plane 106.

Figure 11:
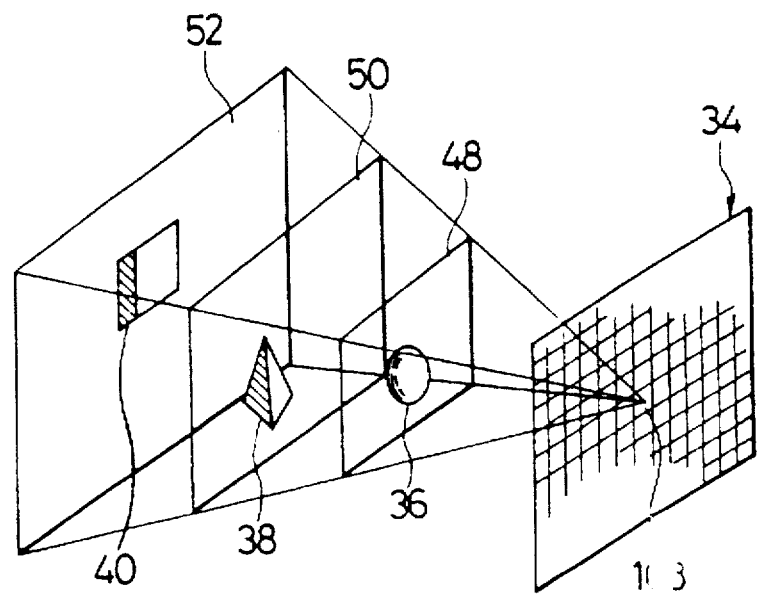
FIG. 11 is an explanatory diagram showing the formation of projection 2-dimensional data for objects which independently exist in the depth direction.
Figure 12:
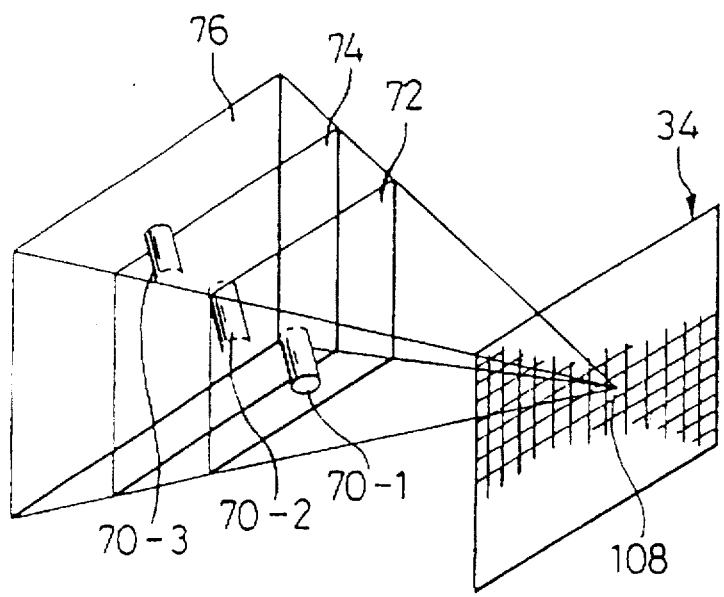
FIG. 12 is an explanatory diagram showing the formation of projection 2-dimensional data for one object divided in the depth direction.

FIG. 11 shows the principle to form the 2-dimensional depth images in FIG. 6. First, the hologram forming surface 34 is divided into small surfaces in a matrix manner, thereby forming segment holograms 108 as minimum units of the hologram expression. A size of segment hologram 108 is set to about 1 mm or less in each of the vertical and horizontal directions. For simplicity of explanation, the segment holograms are not shown to scale or number. Subsequently, the 2-dimensional pixel information when each of the segment holograms 108 of the hologram forming surface 34 is set to a visual point and the objects 36, 38, and 40 in the respective zones are seen, is formed as 2-dimensional image data on the 2-dimensional planes 48, 50, and 52. For example, in case of the object 36 of the 2-dimensional plane 48 belonging to the first zone on this side, the 3-dimensional pixel data to express the object 36, when it is seen by setting a visual point to the central segment hologram 108 of the hologram forming surface 34, is converted into the plane pixel data of the 2-dimensional plane 48. The formation of such 2-dimensional depth images is also similarly executed as shown in FIG. 12 with respect to the case where the single object 70 shown in FIG. 8 is divided into a plurality of zones.

Figure 13:
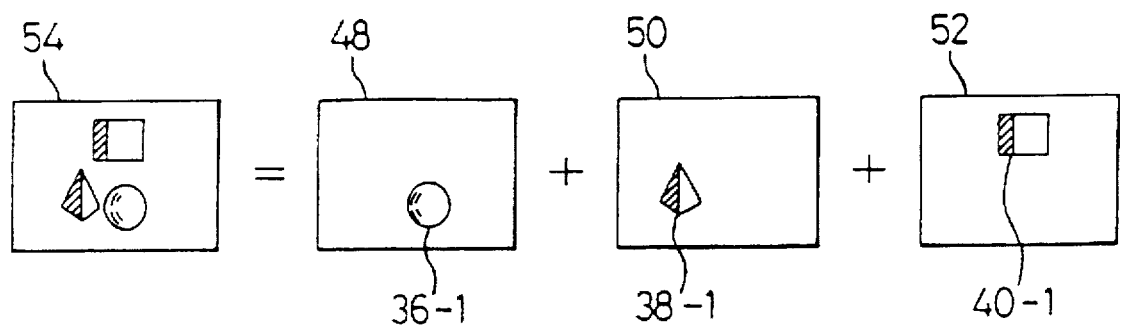
FIG. 13 is an explanatory diagram of 2-dimensional data formed in FIG. 11.
Figure 14:
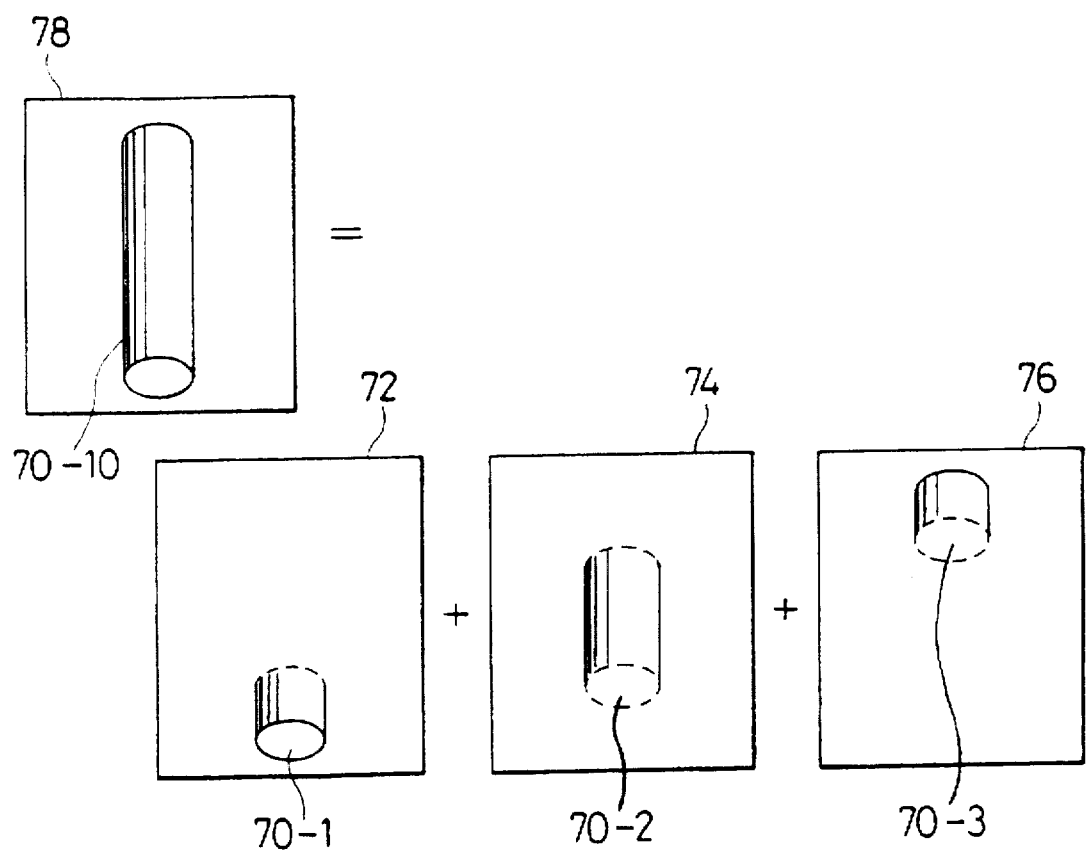
FIG. 14 is an explanatory diagram of 2-dimensional data formed in FIG. 12.

FIG. 13 shows 2-dimensional image data 36-1, 38-1, and 40-1 of the 2-dimensional planes 48, 50, and 52 obtained by setting a visual point to the central segment hologram 108 in FIG. 11. By overlapping those data, synthesized 2-dimensional image data 54 can be obtained. FIG. 14 shows the 2-dimensional image data 70-1, 70-2, and 70-3 obtained when setting a visual point to the central segment hologram 108 with respect to the 2-dimensional planes 72, 74, and 76 with regard to FIG. 12. In this case as well, by overlapping the three 2-dimensional image data, synthesized 2-dimensional image data 78 as 2-dimensional image data 70-10 of a continuous cylindrical body can be obtained.

Figure 15A:
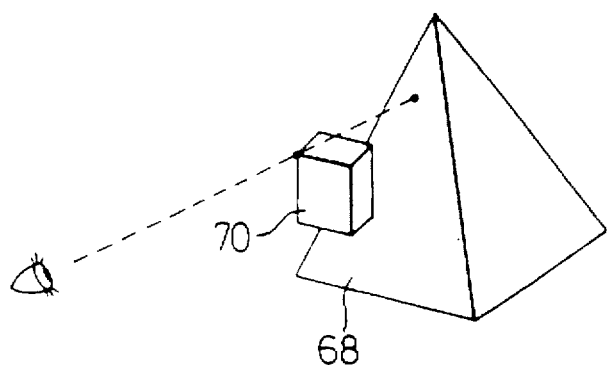
FIGS. 15A and 15B are explanatory diagrams showing the relations between the positions of two objects and the projection data when projection 2-dimensional data is formed.
Figure 15B:
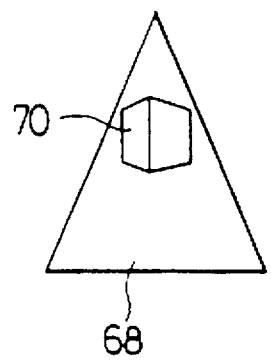
Figure 16A:
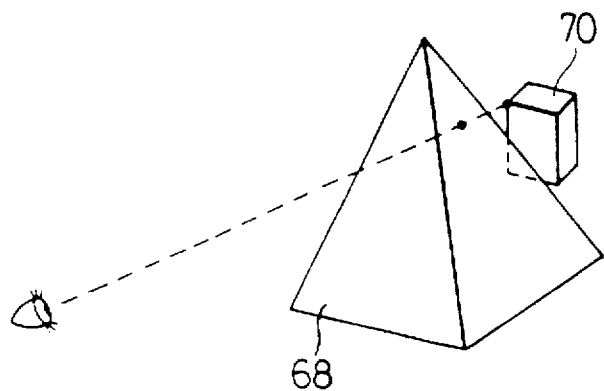
FIGS. 16A and 16B are explanatory diagrams of projection data in the case where the objects in FIGS. 15A and 15B are replaced.
Figure 16B:
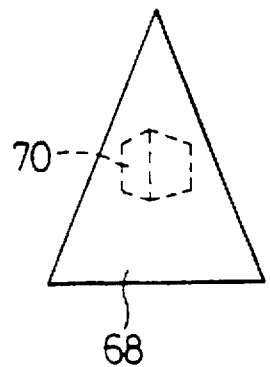

The method whereby 2-dimensional images when an object is seen from a plurality of different directions are formed on the basis of the 3-dimensional data as mentioned above can be realized by using the 3-dimensional display technique in the conventional computer graphics. In this case, processes of hidden lines or hidden areas are also included so that the side surface which is seen is changed in accordance with the observing direction. For example, as shown in FIG. 15A, when the object 70 exists in front of an object 68, the hidden area process is executed so that a part of the plane of the object 68 does not appear by the object 70, as shown in FIG. 15B. As shown in FIG. 16A, on the contrary, when the object 70 exists behind the object 68, the hidden area process is executed so that the object 70 does not appear on the plane of the object 68 as shown in FIG. 16B. With respect to a shadow when a depth of a 2-dimensional image is formed, 2-dimensional image data is produced by the projection, which becomes radial, while setting the segment hologram 108 to which a visual point is located into an origin produced so that three images are continuous, upon observation even when the objects divided into three zones are displayed at different distances, as shown in FIGS. 11 and 12.

When the size in each of the vertical and horizontal directions of the segment hologram 108 is small, i.e., 1 mm or less then, even when 2-dimensional image data is formed by shifting a visual point on a unit basis of the segment hologram 108 and even when the 2-dimensional images displayed at different distances in the depth direction are overlapped, the continuity is not lost. When 2-dimensional image data is formed in a case of observing the object while setting a visual point to each position of the segment holograms 108 formed by being divided on the hologram forming surface 34, a positional change between the adjacent segment holograms 108 can be set to about 0.3 to 1 degree in a case of a change in the observing direction of the object. Therefore, instead of moving a visual point while dividing the hologram forming surface 34 into the regions of a plurality of segment holograms 108 at regular intervals, visual points are set to the positions which are changed by every predetermined angle within a range of about 0.3 to 1 degree with respect to the observing direction in both of the horizontal and vertical directions while setting the center of the hologram forming surface 34 to a start point. Two-dimensional image data of each zone can be also calculated every visual point position.

Calculation of Phase Distribution

The principle of a hologram will be first described. One laser beam is divided into two beams. One of the laser beams is irradiated to an object. A hologram is obtained by an interference of two light fluxes of the laser beam (object light) which is scattered by the object and another laser beam (reference light). Now, assuming that a wave front of the reference light is set to $R \cdot \exp(j\phi_r)$ and a wave front of the object light is set to $O \cdot \exp(j\phi_o)$, an exposure intensity $I_H$ of the hologram is $$I_H = R^2 + O^2 + 2 \cdot R \cdot O \cos(\phi_o - \phi_r) \qquad (1)$$

In a case of developing the hologram, changes in amplitudes and phases which are proportional to the exposure intensity $I_H$ of the equation (1) occur in the hologram. To electrically form a hologram, it is sufficient to use a space light modulating device such as a liquid crystal device or the like which can change the amplitude and phase of the light.

By inputting the same wave front as the reference light to the hologram formed as mentioned above, a hologram can be reconstructed. In the exposure intensity $I_H$ of the equation (1), since only the third term of the right side contributes to the reproduction of the object light, consideration will now be made with respect to the third term of the right side. A transmission light T from the hologram is $$\begin{aligned} T &= I_H \cdot R \cdot \exp(j\phi_r) \\ &\infty \ 2 \cdot R \cdot O \cdot \cos(\phi_o - \phi_r) \cdot \exp(j\phi_r) \\ &= O \cdot \exp(j\phi_r) + O \cdot \exp\{-j(\phi_o - 2 \cdot \phi_r)\} \end{aligned} \qquad (2)$$

The first term of the right side of the equation (2) indicates that the wave front from the object was reconstructed. The second term of the right side indicates a conjugate wave of the object light. From the above description of the principle, it will be understood that it is sufficient to calculate only the third term of the right side of the equation (1) to calculate a phase distribution of the hologram.

Figure 17:
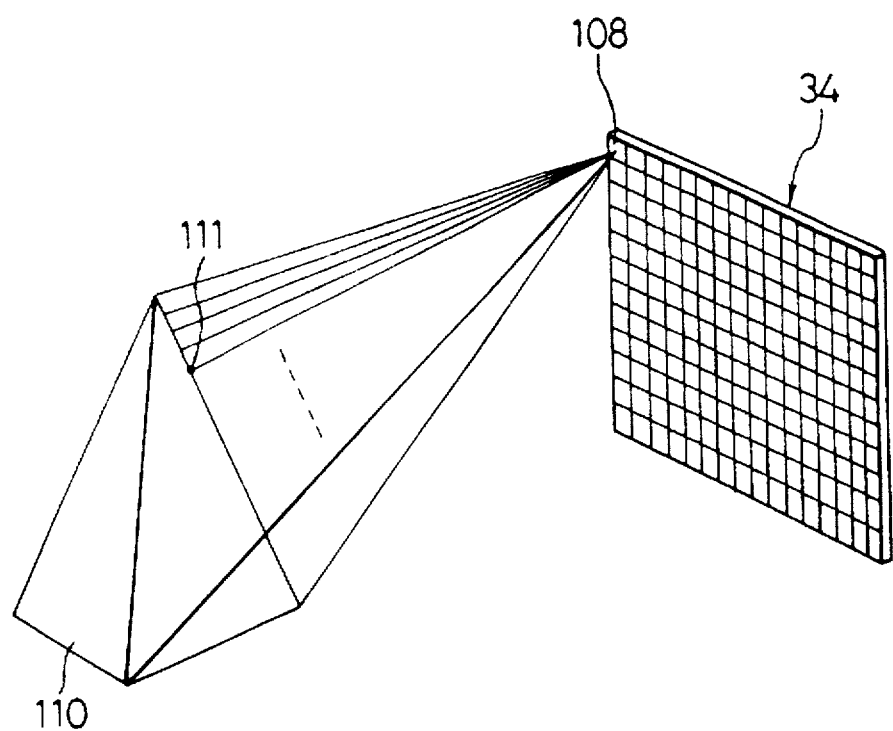
FIG. 17 is an explanatory diagram showing the principle of a phase distribution calculation to form a Fresnel type hologram.

FIG. 17 shows the principle to form a Fresnel type hologram. Now, assuming that the reference light is a plane wave, since an intensity of the plane wave is not changed in dependence on the location, a light intensity R can be ignored. On the other hand, when the plane wave enters perpendicularly to the hologram surface, it is also possible to set the phase $\phi_r = 0$.

Assuming that a luminance (scattering degree) of a sampling point 111 having coordinates $(X_i, Y_i, Z_i)$ of an object 110 is set to $I_i$, the exposure intensity $I_H$ of the point (segment hologram) 108 on the hologram forming surface is $$I_H = \Sigma\{(I_i/r) \cdot \cos(k \cdot r)\} \qquad (3)$$

where, k the number of waves of the laser beam $$r = \sqrt{\{(X_i - X_{hi})^2 + (Y_i - Y_{hi})^2 + Z_i^2\}} \qquad (4)$$

Figure 18:
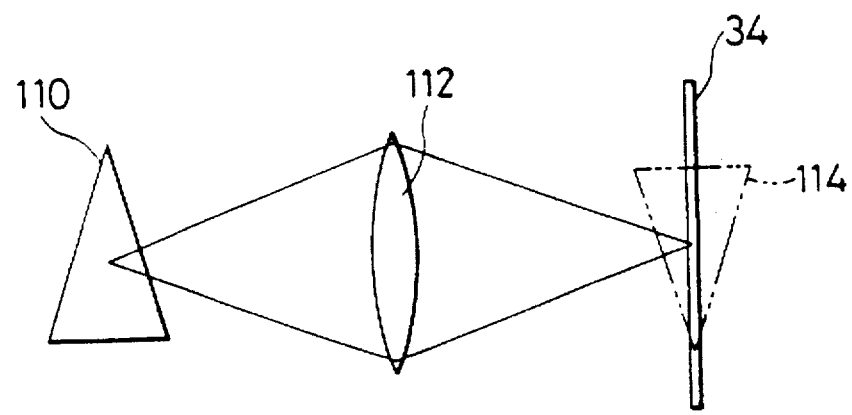
FIG. 18 is an explanatory diagram showing the principle to form an image type hologram.
Figure 19:
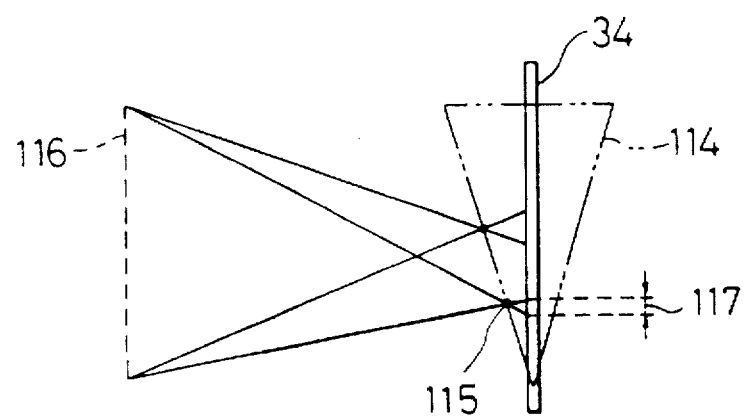
FIG. 19 is an explanatory diagram showing a calculation range of a phase distribution in the formation of the image type hologram.

In a case of the Fresnel type hologram shown in FIG. 17, since the light reflected from the object 110 reaches the whole hologram, it is necessary to execute the calculations of the equations (3) and (4) for the whole area of the hologram forming surface 34. On the other hand, in a case of an image type hologram shown in FIG. 18, the image of the object 110 is formed as a real image 114 at the position of the hologram forming surface 34 by an image forming lens 112. Therefore, as shown in FIG. 19, for example, when a sampling point 115 of the image 114 is seen, the light reaches only in a space in a region 117 of the hologram forming surface 34 that is decided by a virtual opening 116. A region to perform the calculations of the equations (3) and (4) is limited.

In the invention, for example, with respect to the central segment hologram 108 of the hologram forming surface shown in FIG. 11, each 2-dimensional pixel of each 2-dimensional depth image data obtained from the objects 36, 38, and 40 in the three divided zones is set to a sampling point and the equations (3) and (4) are calculated. Exposure intensities $(I_{Hi})_1$, $(I_{Hi})_2$, and $(I_{Hi})_3$ on the hologram are obtained every zone. A phase distribution of one segment hologram 108 is calculated as a sum of the exposure intensities on the hologram obtained every zone. It is expressed by the following general equation with respect to the zone Nos. 1 to n.

$$I_H = (I_{Hi})_1 + (I_{Hi})_2 + \ldots + (I_{Hi})_n \qquad (5)$$

Adjustment of Size of Solid Image which is Displayed

Figure 20:
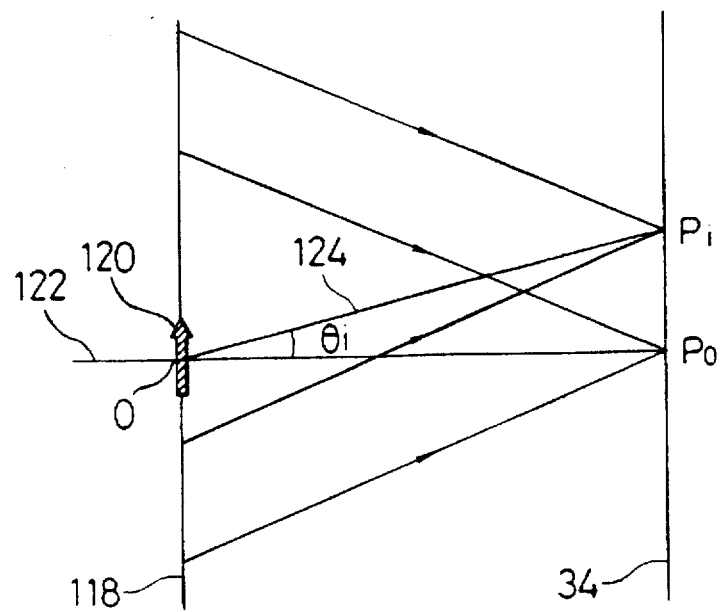
FIG. 20 is an explanatory diagram showing the optical relation between the depth image display surface and the hologram forming surface to calculate the phase distribution to enlarge a display of a solid image.

According to the invention, the size of solid image which is displayed is changed by the following method. FIG. 20 shows the hologram forming surface 34 and a 2-dimensional depth image display surface 118 which are arranged to be separated from each other by a predetermined distance. An image 120 is displayed on the image display surface 118. For simplicity of explanation, the image 120 is shown as an upward arrow. A cross point of a center line 122 in the Z-axis direction which is set onto the depth image display surface 118 and passes through an origin O is set to a point $P_O$. The $P_O$ point constructs one segment hologram. A $P_i$ point comprising another segment hologram, exists on the upper side of the $P_O$ point. A phase distribution at the $P_O$ point is obtained from all of the sampling points of the image 120 on the basis of the equations (3) and (4). Similarly, a phase distribution can also be obtained from all of the sampling points of the image 120 with respect to the Pi point. The image 120 is seen differently at the $P_O$ and $P_i$ points by an amount corresponding to only the parallax. When the 2-dimensional images of the depth image display surface 118 are fetched at each of the different $P_O$ and $P_i$ points on the hologram forming surface 34, the origin O is located at the position which is deviated by only an angle $\theta_i$ at the $P_i$ point. In a case of enlarging the image 120, it is enlarged on the depth image display surface 118 around the origin O as a center and the phases at the $P_O$ and $P_i$ points are calculated on the basis of the result of the enlargement.

Figure 21:
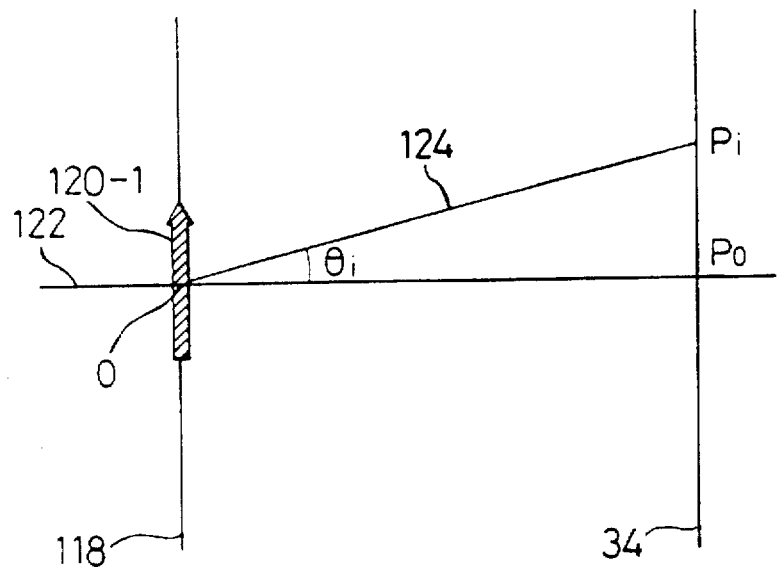
FIG. 21 is an explanatory diagram of a state in which an image is enlarged twice as large as that in FIG. 20.

FIG. 21 shows a state in which the image 120 in FIG. 20 is enlarged twice to thereby obtain an image 120-1. In this case as well, an angle when the origin O is seen from the $P_O$ and $P_i$ points is equal to $\theta i$ and is not changed. No contradiction occurs in the continuity of the parallax between the image seen from the $P_O$ point and the image seen from the $P_i$ point. It is desirable that the origin O of the image 120 is set to a sharp edge portion on the object such that, it can be always seen at the same position even when the visual point position is changed on the hologram forming surface 34.

Adjustment of Distance of Solid Image which is Displayed

Figure 22:
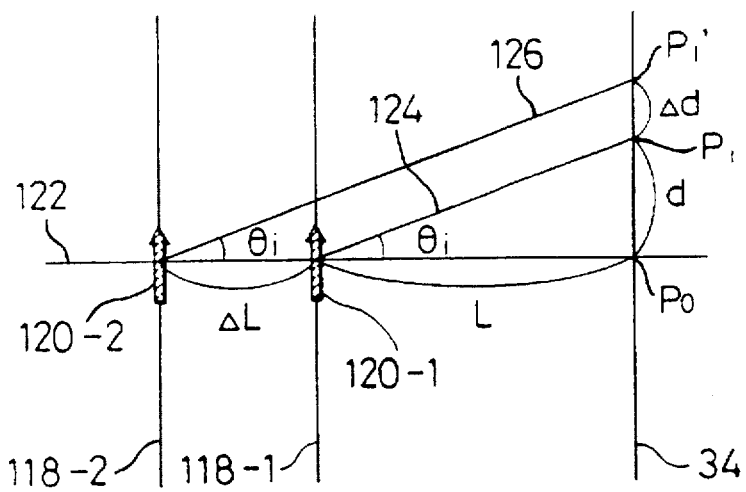
FIG. 22 is an explanatory diagram showing the optical relation between the depth image display surface and the hologram forming surface to move the display position of a solid image.

The distance of the solid image which is displayed can be changed by the following method. FIG. 22 shows the relation when the distance of the depth image display surface to display the image 120-1 is changed for the hologram forming surface 34. First, it is now assumed that the image 120-1 on the depth image display surface 118-1 existing at a position which is away from the hologram forming surface 34 by a distance L in the depth direction is fetched at different $P_O$ and $P_i$ points on the hologram forming surface 34. In this case, the origin O of the image 120-1 is located at the position which is deviated from the center by only an angle $\theta_i$ at the $P_i$ point. In case of moving a depth image display surface 118-1 to a far position by a distance of only ΔL, a calculation point of the phase distribution is changed from $P_i$ to $P_i'$ so as to maintain the angle θi. A shift amount Δd of the calculation point in the phase distribution calculation in this instance is $$\Delta d = (\Delta L/L)d$$

Figure 23:
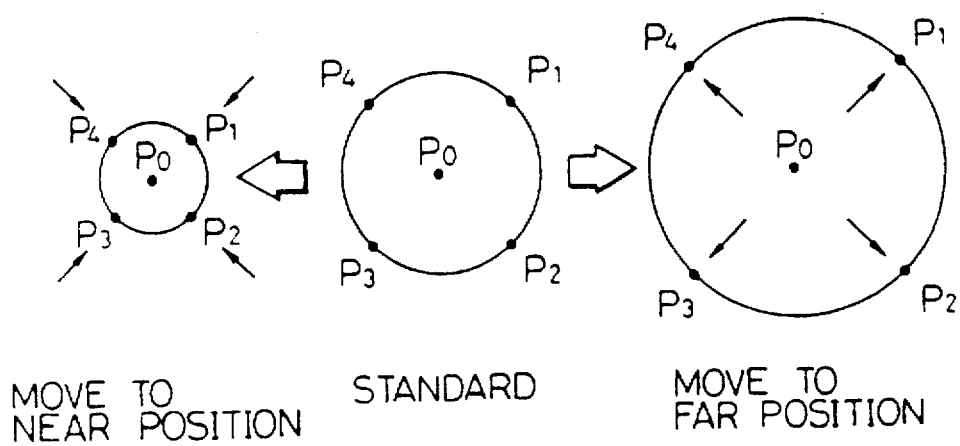
FIG. 23 is an explanatory diagram showing a change in phase distribution calculation point at the hologram forming surface in association with the movement of the image display position.

FIG. 23 shows changes of four calculation points $P_1$ to $P_4$ existing around the phase distribution calculation point (segment hologram) $P_0$ in the case where the image display surface is moved to a far position on the right side that is away from the central reference position or in the case where it is moved to a near position on the left side. That is, when the image display surface is moved to a near position, the peripheral calculation points $P_1$ to $P_4$ are closely collected. When it is moved to a remote position, the peripheral calculation points $P_1$ to $P_4$ are radially extended. When the display surface is moved to a remote position, the intervals among the calculation points are widened. Therefore, a 2-dimensional depth image, when it is seen from a position between the adjacent calculation points, is obtained by the image interpolation. A phase distribution at the interpolation calculation point is calculated from the interpolation image, thereby keeping the continuity of the reconstructed solid image in the case where the display surface was moved to a far position.

Figure 24:
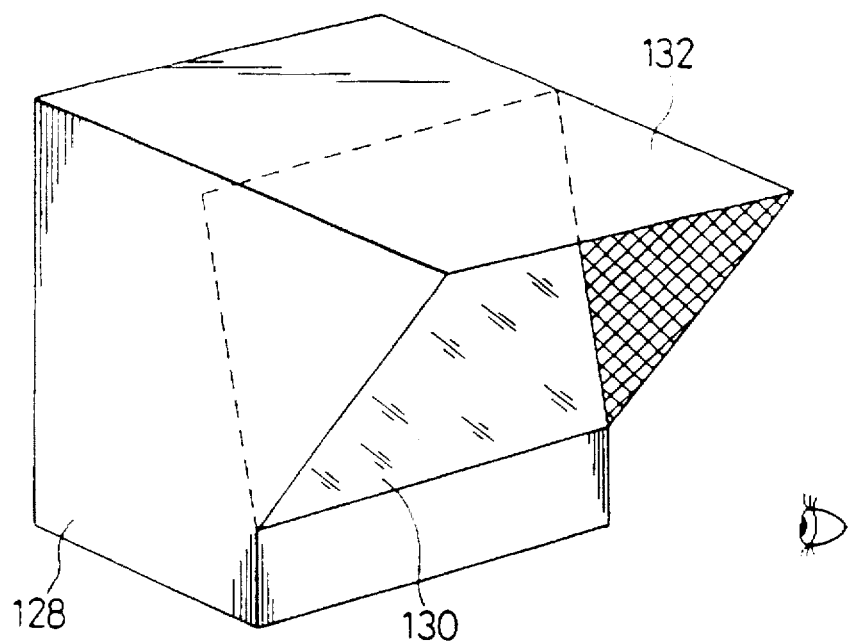
FIG. 24 is an explanatory diagram showing an embodiment of a stereoscopic display apparatus of the invention.

Display of Phase Distribution and Display of Solid Image by Change in Optical Wave Front FIG. 24 shows an external view of a hologram display apparatus for displaying a solid image by the irradiation of a reference light while expressing the phase distribution obtained by the calculation. A space light modulating apparatus 130 to electrically form a hologram is provided in front of an apparatus main body 128. A hood 132 to shield the 0-th order light which transmits the space light modulating apparatus 130 is provided.

Figure 25:
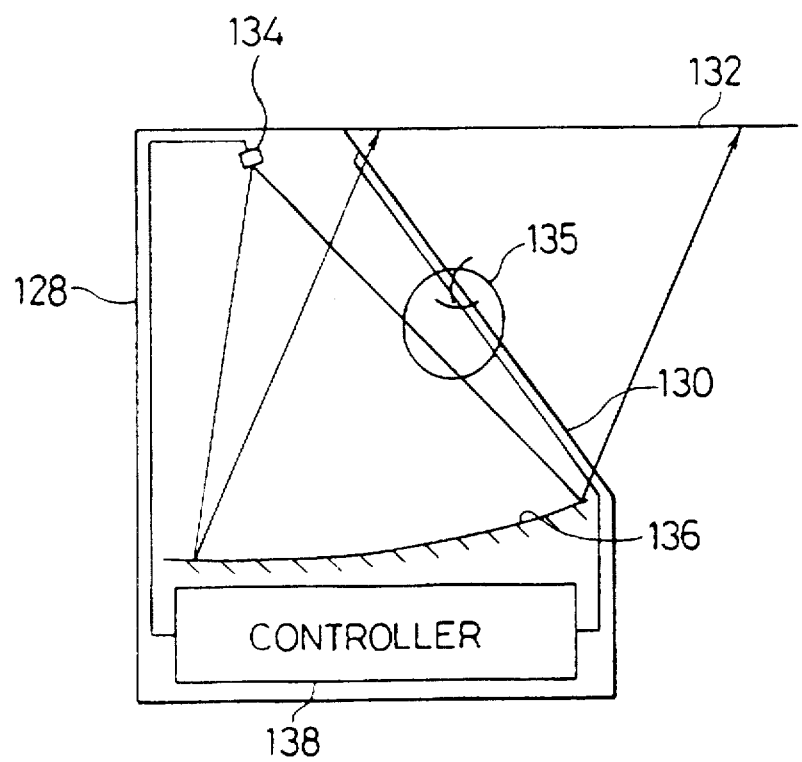
FIG. 25 is an explanatory diagram showing an internal structure of FIG. 24.

FIG. 25 shows an internal structure of FIG. 24. A laser light source 134 serving as a point light source, a collimating mirror 136, and a controller 138 are provided in the apparatus. The controller 138 gives the phase distribution obtained by the calculation to the space light modulating apparatus 130. In this state, a spherical wave irradiated as a point light source from the laser light source is converted into a parallel light by the collimating mirror 136 and is irradiated to the space light modulating apparatus 130, thereby reconstructing a solid image 135. In this case, since a partial parallel light directly transmits the space light modulating apparatus 130 as a 0-th order light, the light is shielded by the hood 132.

An arbitrary laser light source can be used as a laser beam 134. However, it is desirable to use a small semiconductor laser. The semiconductor laser has a light emission spectrum whose wavelength width is about a few nm or less and can reproduce a clear solid image. As a wavelength which is used, an arbitrary wavelength can be used so long as it lies within a visible light range. It is, however, necessary to consider the wavelength of the light source which is used for reproduction at the stage of calculation of the phase distribution of the hologram. Practically speaking, it is possible to use a semiconductor laser which emits a red light having a wavelength on the order of 600 nm, a green light having a wavelength on the order of 500 nm, or a blue light having a wavelength on the order of 400 nm. In case of the Fresnel type hologram such that the object 110 is away from the hologram forming surface 34 as shown in FIG. 17, as the distance is long, the phase distribution is more easily influenced by the color diffusion depending on the wavelength width of the reproduction light. It is, therefore, desirable to use a semiconductor laser of a narrow wavelength band. On the other hand, in case of the image type hologram such that the object 114 appears near the hologram forming surface 34 as shown in FIG. 18, since the phase distribution is hardly influenced by the color dispersion depending on the wavelength width of the reproduction light, a clear reproduction image can be obtained even if a wavelength width is relatively wide. In the image type hologram, therefore, a halogen lamp or the like having a wide wavelength width of about 10 nm, can be also used. In FIG. 25, a spherical wave is directly emitted from the laser light source 134. It is, however, also possible to use a construct such that a laser beam is emitted through an objective lens and a pin hole or that a laser beam is transmitted by an optical fiber and is dispersed upon emission.

Figure 26:
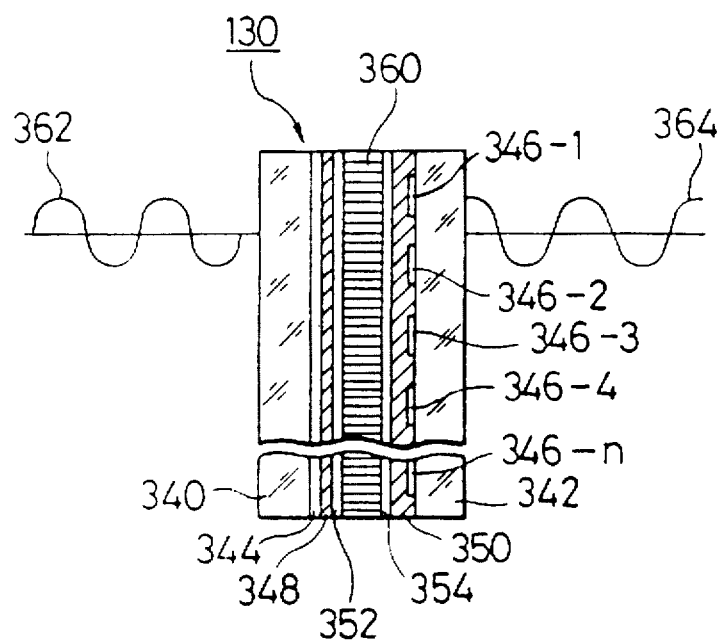
FIG. 26 is a structural explanatory diagram of a liquid crystal display which is used as a space light modulating apparatus in the invention.

FIG. 26 shows an embodiment of a space light modulating apparatus which is used in the invention. In the embodiment, a liquid crystal display is used as a space light modulating apparatus 130. Namely, a uniform transparent electrode 344 is provided subsequent to a glass substrate 340 on the incident surface side. Branched transparent electrodes 346-1 to 346-n constructing one display segment are formed subsequent to a glass substrate 342 on the outgoing side. Subsequent to the transparent electrodes 344 and 346-1 to 346-n, orientation films 352 and 354 are provided through insulating layers 348 and 350. A liquid crystal 360 is provided between the orientation films 352 and 354. The liquid crystal display is driven in a manner such that the voltage corresponding to the calculated phase information is applied every liquid crystal cell which is determined by each of the divided electrodes 346-1 to 346-n. A refractive index of the liquid crystal cell in the transmitting direction of a reproduction light 362 is changed in accordance with the applied voltage.

Figure 27:
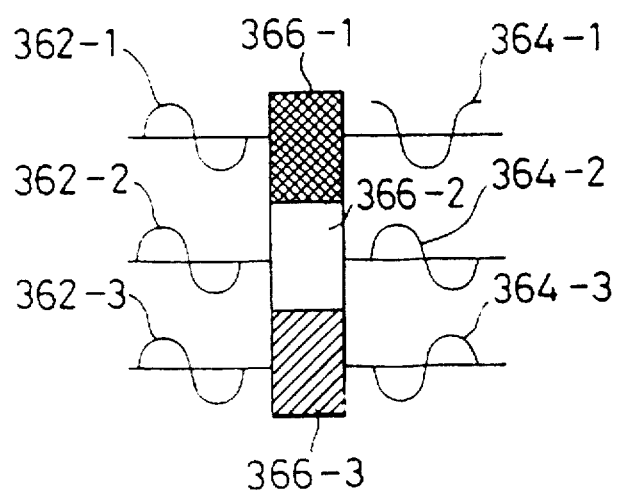
FIG. 27 is an explanatory diagram showing a phase modulation for reproduction lights with respect to three liquid crystal cells in FIG. 26.

FIG. 27 shows a state of a phase modulation in case of three pixels of the liquid crystal display as an example. When production lights 362-1 to 362-3 comprising, for example, plane waves having a coincident phase are inputted from the left side to pixels 366-1, 366-2, and 366-3 which were driven in different phase states, namely, different refractive indices, phase deviations occur among lights 364-1 to 364-3 upon outgoing because the optical distances in the liquid crystal differ due to the pixels 366-1 to 366-3. It is ideally demanded that an arbitrary phase within a range from 0 to 2π, namely, a range of the length corresponding to the wavelength as an optical distance. However, even when the phase is discretely expressed by multivalue levels, the phase distribution can be approximately expressed to a practical range. A thickness d of liquid crystal is determined so as to satisfy conditions such that the product Δn×d of a change Δn in the maximum refractive index which can be changed by the applied voltage and the thickness d is equal to a wavelength λ of the reproduction light. In order to accurately express the phase distribution and to obtain a clear reconstruction solid image, it is necessary to reduce the liquid crystal cell to a size on the order of the wavelength and to use a liquid crystal display of a high resolution.

Figure 28:
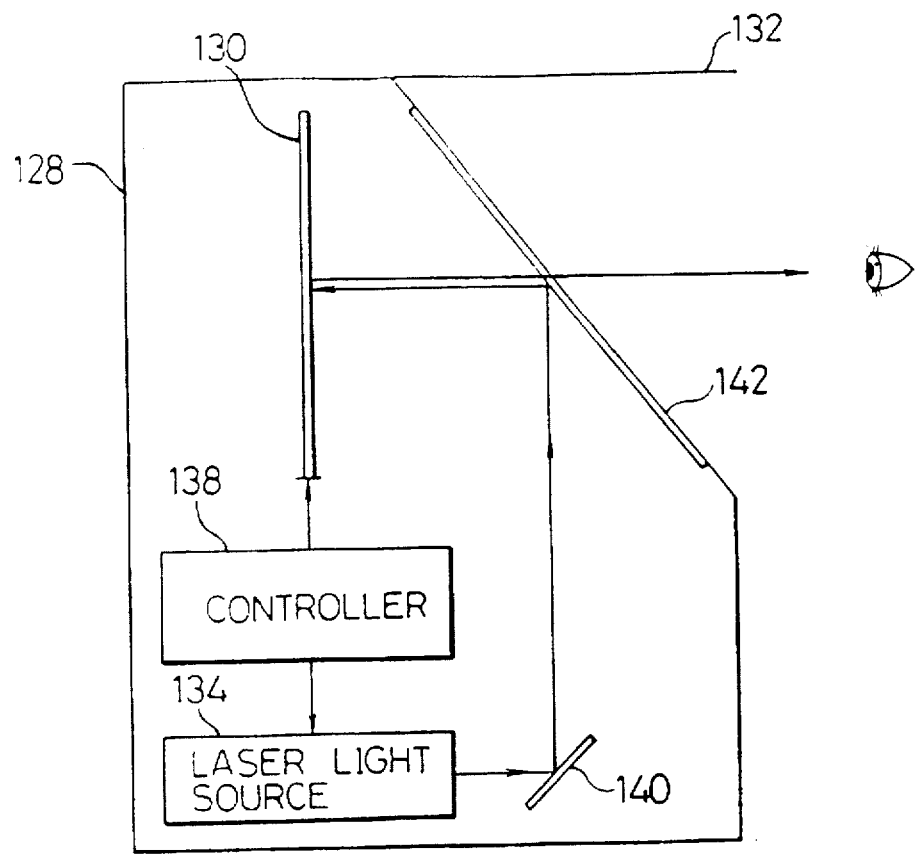
FIG. 28 is an explanatory diagram of another stereoscopic display apparatus of the invention using a space light modulating apparatus of the reflecting type.
Figure 29:
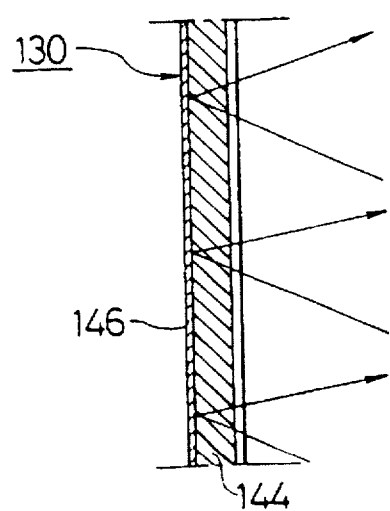
FIG. 29 is an explanatory diagram of the reflecting type space light modulating apparatus which is used in FIG. 28.

FIG. 28 shows another embodiment of a solid image display apparatus of the invention. Another embodiment is characterized by using a reflecting type space light modulating apparatus. The reflecting type space light modulating apparatus 130 is provided in the apparatus main body 128. A hologram of the phase distribution calculated by the controller 138 is electronically expressed. The reproduction light from the laser light source 134 is reflected by a mirror 140 and is further reflected by a half mirror 142 and enters the reflecting type space light modulating apparatus 130. The modulation light from the space light modulating apparatus 130 transmits through the half mirror 142 and displays a solid image. As shown In FIG. 29, the modulating apparatus 130 receives the reproduction light from one side of a transmitting type liquid crystal display 144 and reflects the light by a reflecting surface 146 on the opposite side. The light is again propagated in the liquid crystal display 144 and is emitted. Since the light passes twice in the transmitting type liquid crystal display 144, as compared with the transmitting type liquid crystal display shown in FIG. 26, a thickness of liquid crystal to obtain a phase change can be reduced into ½. However, a liquid crystal of a homogeneous orientation whose polarization is preserved is used.

Figure 30:
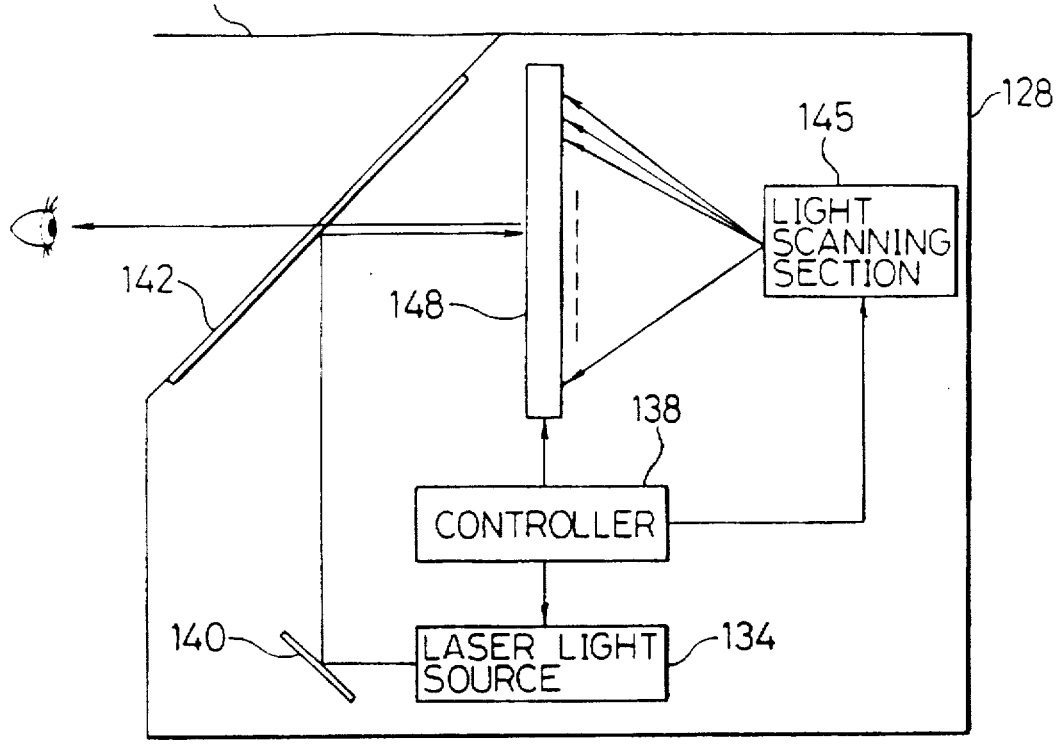
FIG. 30 is an explanatory diagram of a stereoscopic display apparatus of the invention using a space light modulating apparatus of the light writing type.

FIG. 30 shows another embodiment of a solid image display apparatus of the invention. Another embodiment is characterized in that the information of the calculated phase distribution is optically written and reproduced. A space light modulating apparatus 148 in which the phase distribution information can be optically written by a laser beam from a light scanning section 145 is provided in the apparatus main body 128. When the phase distribution information is written by the laser beam from the light scanning section 145 to the space light modulating apparatus 148, the controller 138 controls the space light modulating apparatus 148 into the same state as that of the reflecting type liquid crystal display shown in FIG. 29. In this state, the laser beam from the laser light source 134 is reflected by the mirror 140 and the half mirror 142 and enters as a reproduction light, thereby displaying a solid image through the half mirror 142.

Figure 31:
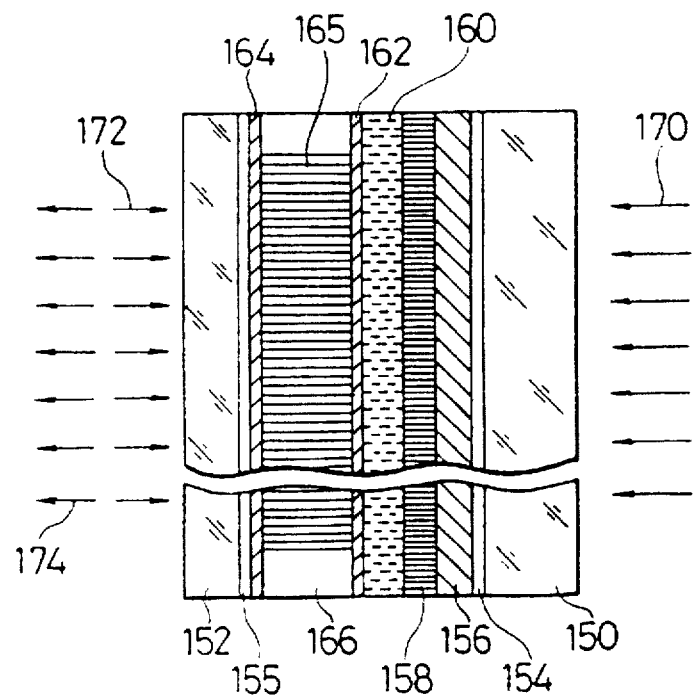
FIG. 31 is a structural explanatory diagram of the space light modulating apparatus of the light writing type which is used in FIG. 30.

FIG. 31 shows a structure of an optically writable space light modulating apparatus which is used in FIG. 30. A transparent electrode 154, a photoconductive portion 156, and a light shielding layer 158 are provided subsequent to a glass substrate 150 on the incident side of a writing light 170. Subsequent to the light shielding layer 158, a dielectric mirror 160 is provided. A glass substrate 152 is provided on the left side in which a reproduction light 172 enters. Subsequently, a transparent electrode 155 is provided. A liquid crystal 165 is arranged between the transparent electrode 155 and the dielectric mirror 160 through insulative layers 164 and 162. The space light modulating apparatus 148 operates in the following manner. First, when the wiring light 170 is received by the photoconductive portion 156, a resistance value of the photoconductive portion 156 decreases as the intensity of light is large. When the resistance value of the photoconductive portion 156 changes, although the driving voltage is constant, a voltage which is applied across the liquid crystal 165 through the dielectric mirror 160 changes by an amount corresponding to only the resistance value. As mentioned above, when the voltage which is applied to the liquid crystal 165 changes, a refractive index changes. When the incident reproduction light 172 is reflected by the dielectric mirror 160 and is returned, it is converted into a modulation light 174 which has been subjected to a phase modulation.

Figure 32:
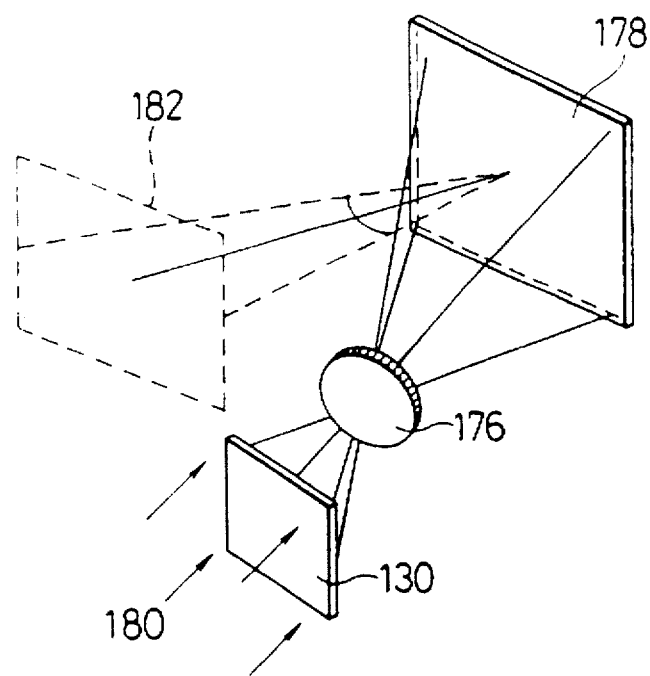
FIG. 32 is an explanatory diagram of a stereoscopic display apparatus of the invention using an enlarging screen.

FIG. 32 shows another embodiment of the stereoscopic display apparatus of the invention. In the embodiment, a reproduction light 180 is inputted to the space light modulating apparatus 130 using a transmitting type liquid crystal display or the like which expresses the calculated phase distribution and is modulated. After that, the light is enlarged by a protection light optical system 176 and is projected onto a hologram screen 178, thereby enabling a solid image to be seen in a visible range 182 of an angle θ of visibility.

Figure 33:
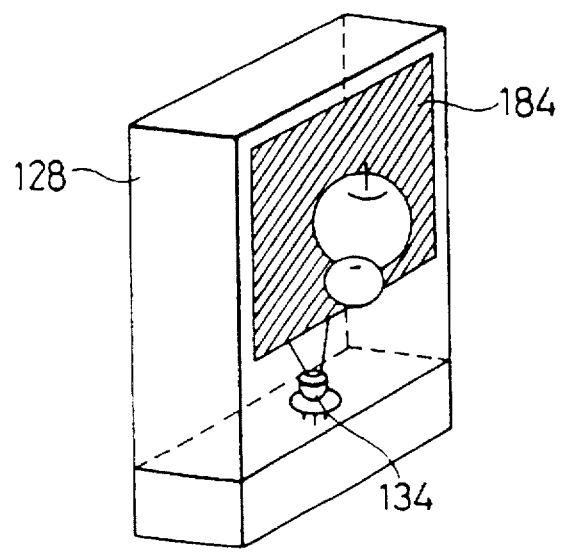
FIG. 33 is an explanatory diagram of a stereoscopic display apparatus of the invention using a space light modulating apparatus with which a refractive hologram, to prevent the transmission of the 0-th order light, is integrated.
Figure 34:
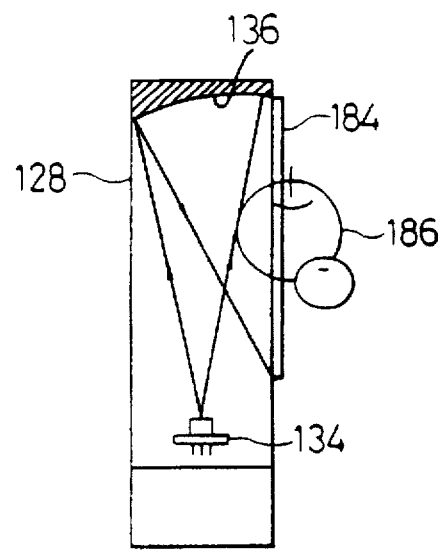
FIG. 34 is an explanatory diagram of an internal structure of the apparatus of FIG. 33.

FIG. 33 shows another embodiment of a stereoscopic display apparatus of the invention, which is characterized in that the hood to prevent the 0-th order light is made unnecessary. Namely, a space light modulating apparatus 184 with which a refractive member to suppress the emission of the 0-th order light is integrated, is provided for an apparatus main body 128. As shown in FIG. 34, therefore, a spherical wave from the laser light source 134 is reflected by the collimating mirror 136 and is inputted to the space light modulating apparatus 184 integrated with the refractive member by a hologram at an incident angle that is equal to or larger than a critical angle of a refractive hologram. Due to this, the 0-th order light is totally reflected and is not emitted to the outside. Thus, the hood to prevent the 0-th order light is unnecessary.

Color Stereoscopic Display Apparatus

In case of displaying a color solid image in the invention, it is sufficient that the production of the 3-dimensional information in step S1, the formation of the depth image in step S2, and the calculation of the phase distribution in step S3 shown in FIG. 1 are executed every component of, for example, R, G, and B.

Figure 35:
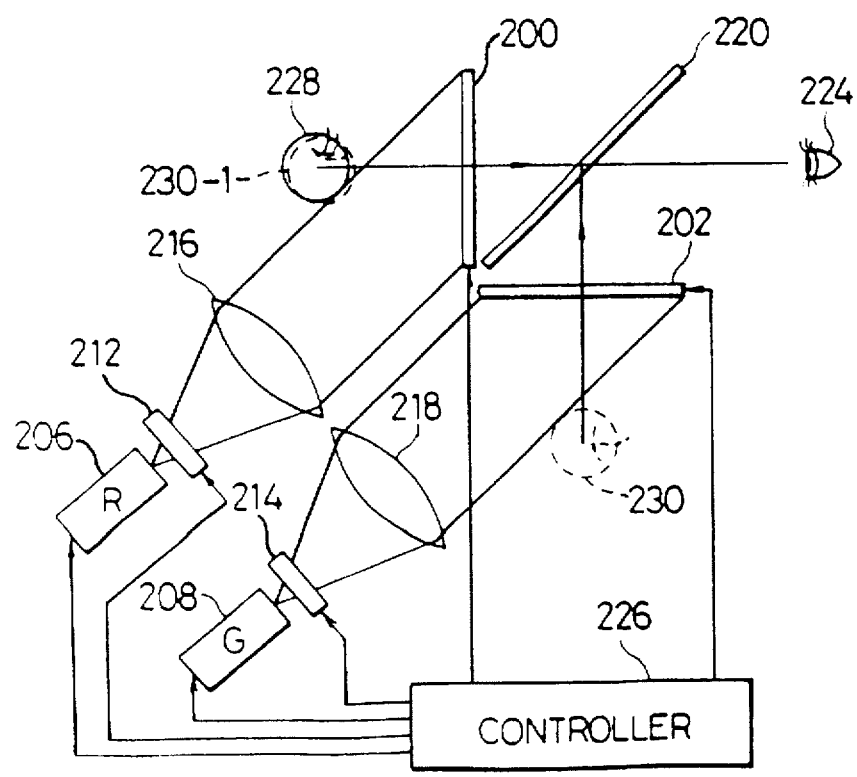
FIG. 35 is an explanatory diagram of a stereoscopic display apparatus of the invention to perform a color stereoscopic display by using two components of R and G.

FIG. 35 shows an embodiment of a color stereoscopic display apparatus for executing a multicolor display by using stereoscopic display apparatuses of two systems. A space light modulating apparatus 200 is driven by a controller 226 in accordance with the phase distribution calculated with respect to, for example, the R component. A space light modulating apparatus 202 is driven in accordance with the phase distribution calculated with regard to the G component. Reproduction lights are emitted from laser light sources 206 and 208 and are irradiated to the space light modulating apparatuses 200 and 202 through shutters 212 and 214 and collimating lenses 216 and 218, thereby displaying an R component solid image 228 and a G component solid image 230. The G component solid image 230 is reflected by a half mirror 220 and can be seen by eyes 224 of an observer. On the other hand, the R component solid image 228 is transmitted through the half mirror 220 and enters the eyes 224. Therefore, the observer can see a synthesized color solid image in which the G component solid image 230 is overlapped on the R component solid image 228.

Figure 36:
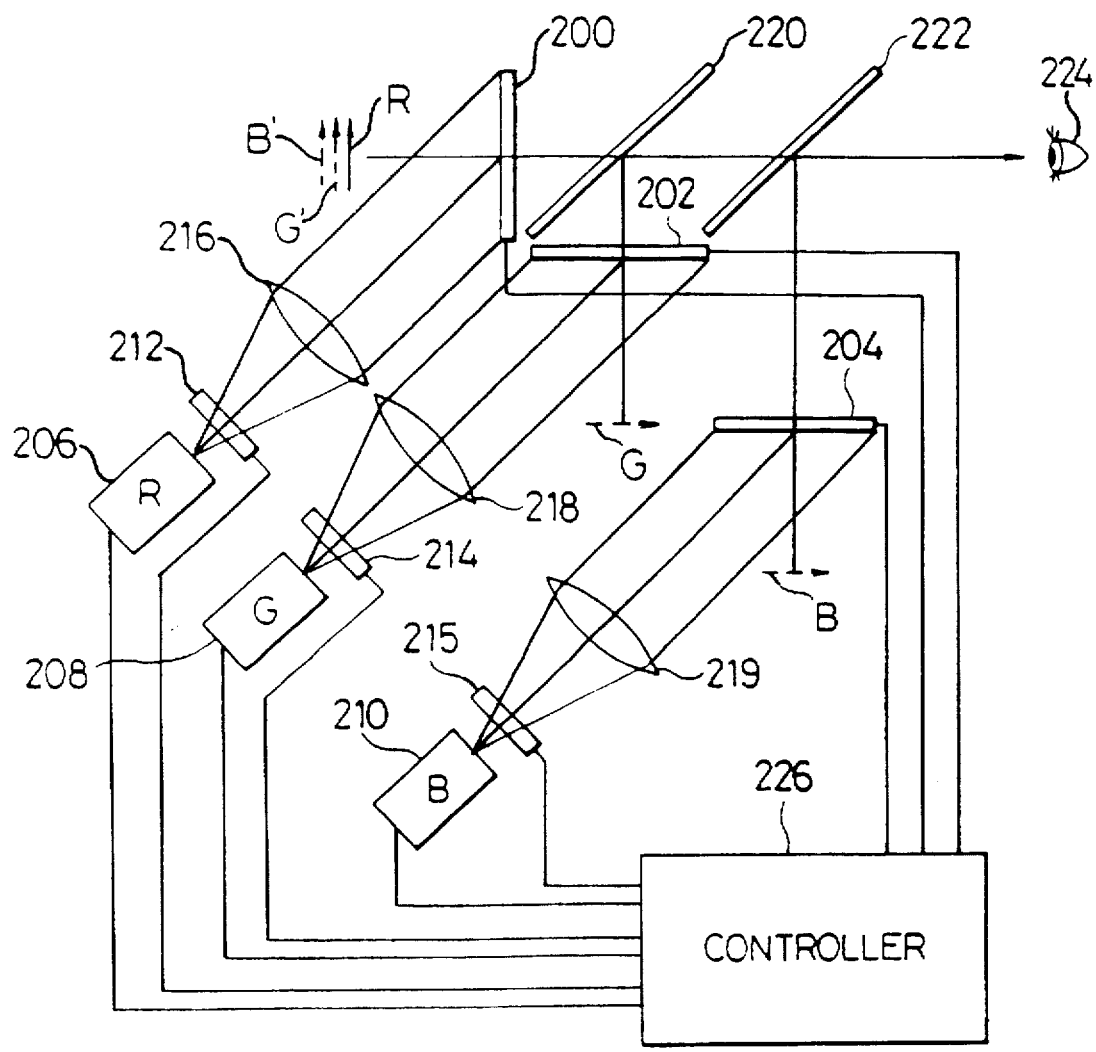
FIG. 36 is an explanatory diagram of a stereoscopic display apparatus of the invention to perform a color stereoscopic display by using three components of R, G, and B.

FIG. 36 shows another embodiment of a color stereoscopic display apparatus of the invention, which is characterized in that a phase distribution is calculated every component of R, G, or B and a synthesized color image is displayed. Namely, in the embodiment of FIG. 36, in addition to the embodiment of FIG. 35, a laser light source 210, a shutter 215, and a collimating lens 219 are provided as a display system of the B component. A space light modulating apparatus 204 which is driven in accordance with the calculated phase distribution with respect to the B component is provided. Further, a half mirror 222 is added in correspondence to the space light modulating apparatus 204. In the embodiment as well, a color synthesized solid image of the RGB components shown by arrows can be seen by the eyes 224 of the observer.

Figure 37:
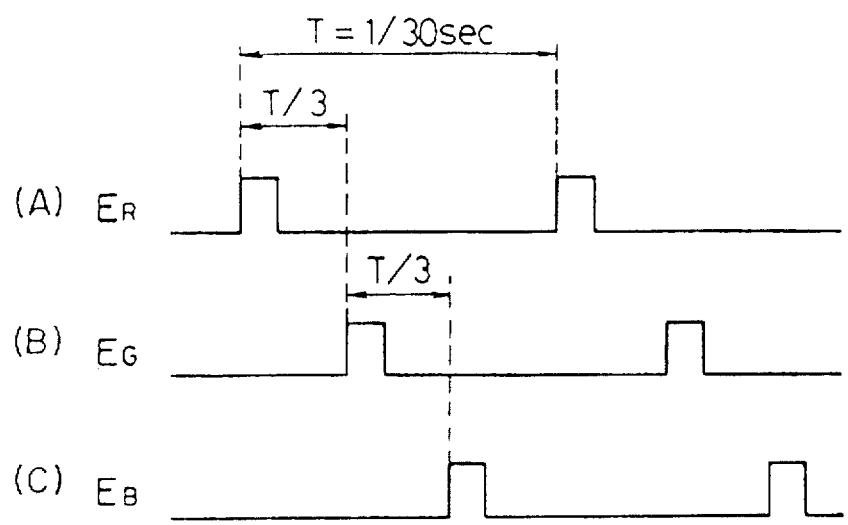
FIG. 37 is a timing chart for time-divisional synthesizes and display of the color components in FIG. 36.

FIG. 37 shows driving signals $E_R$, $K_G$, and $E_B$ for time-divisional display of the RGB components by the opening/closing driving operations of the shutters 212, 214, and 215 by the controller 226 in FIG. 36. The driving signals $E_R$, $E_G$, and $E_B$ are repeatedly generated at a period of time T=1/30 second and are driven so as to have a timing delay of (T/3), respectively. In the case of two R and G components shown in FIG. 35, it is sufficient to set a deviation between the timings of the two signals $E_R$ and $E_G$ to (T/2).

Figure 38:
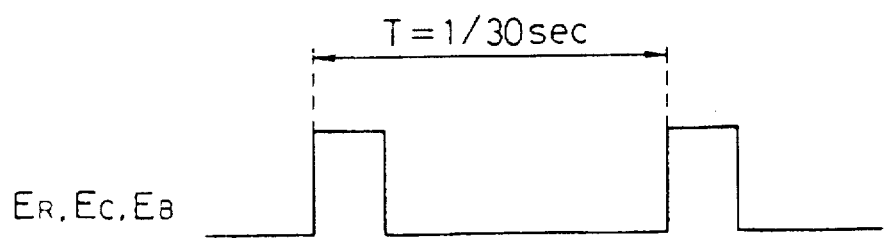
FIG. 38 is a timing chart for position dividing the color components in FIG. 36 at the same time and for synthesizing and displaying.

FIG. 38 is a timing chart showing another driving method in FIGS. 35 and 36. The embodiment is characterized in that the shutters are opened simultaneously at a period of time of T=1/30 second and the solid images of two or three color components are simultaneously displayed at different positions, thereby obtaining a color synthesized image.

Method of Forming Hologram by Exposure

Figure 39:
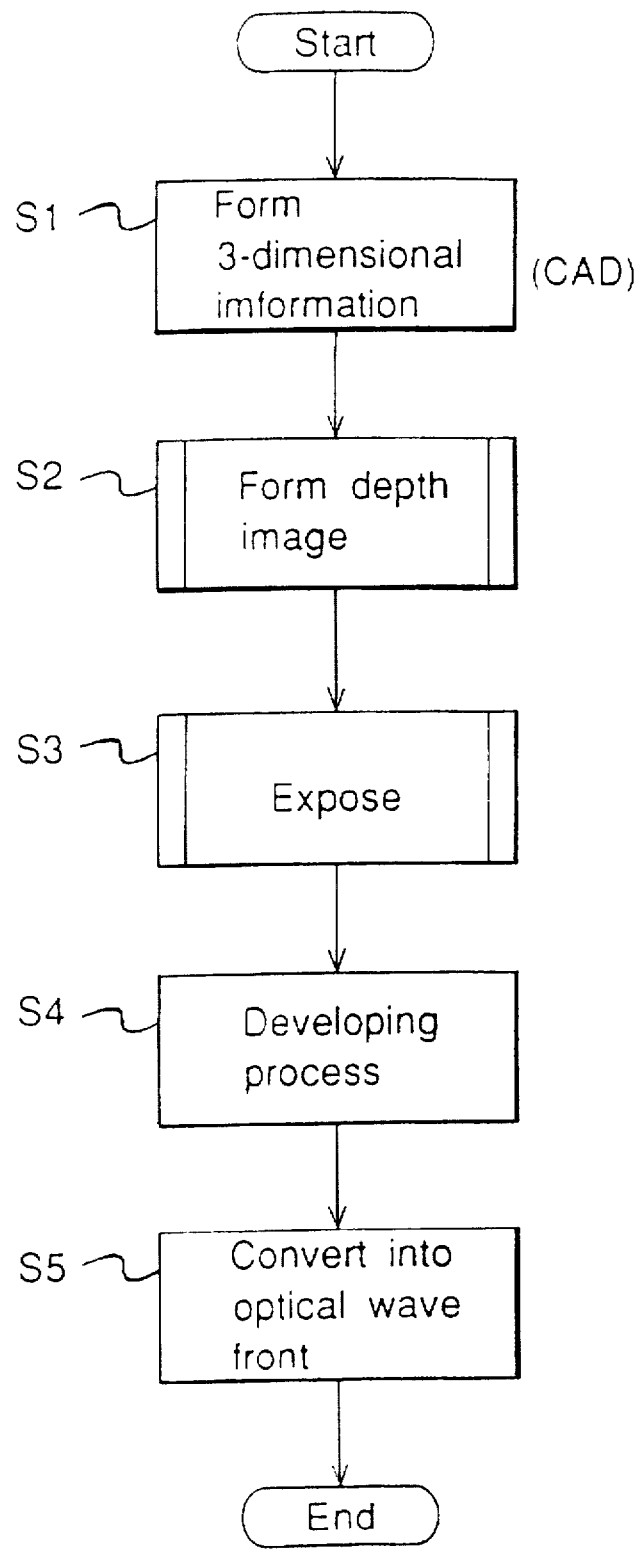
FIG. 39 is a flowchart showing a fundamental processing procedure of a hologram forming method in the invention.

A flowchart of FIG. 39 shows a hologram forming method whereby a hologram is exposed and formed on a hologram dry plate or the like. In the hologram forming method, the formation of the 3-dimensional information in step S1 and the formation of the depth image in step S2 are fundamentally the same as those in the stereoscopic display method of a hologram shown in FIG. 1 and differs from FIG. 1 with respect to a point that no phase distribution is calculated.

Upon formation of the 2-dimensional information image in step S2, in place of calculating the phase distribution, 2-dimensional data, when an object in each zone is seen from a plurality of segment hologram regions of the hologram forming surface, is directly used and an exposure in step S3 is executed. In the exposure in step S3, a 2-dimensional image corresponding to the liquid crystal display or the like is displayed every hologram forming position. A multiple exposure for each zone is executed by an interference of two light fluxes of the 2-dimensional image light that is produced by irradiating an illumination light and the reference light. After completion of the exposure to the hologram dry plate as a recording medium, a developing process is executed in step S4. The formed hologram is provided for the solid image display apparatus and by irradiating the reference light, the reference light is optically converted into the wave front in accordance with a phase distribution of the exposed hologram, thereby displaying a solid image.

Figure 40:
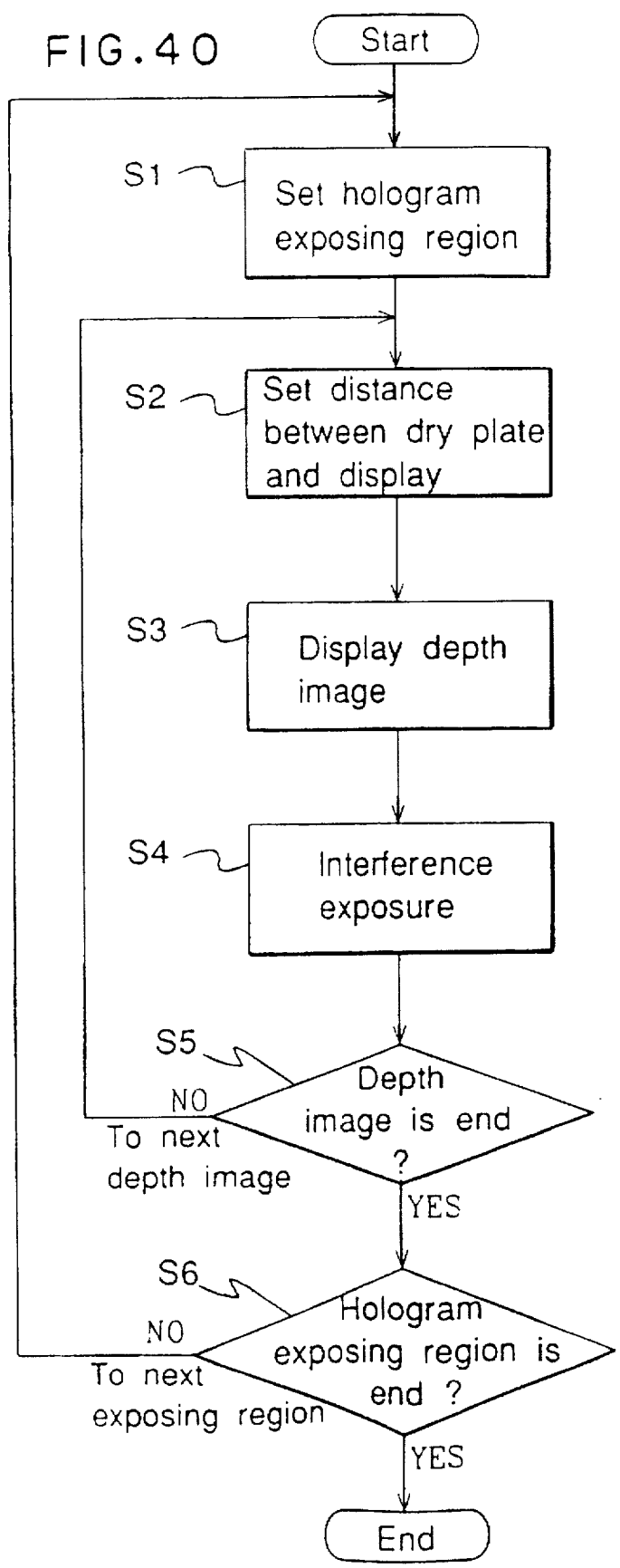
FIG. 40 is a flowchart showing the details of an exposing step in FIG. 39.
Figure 41:
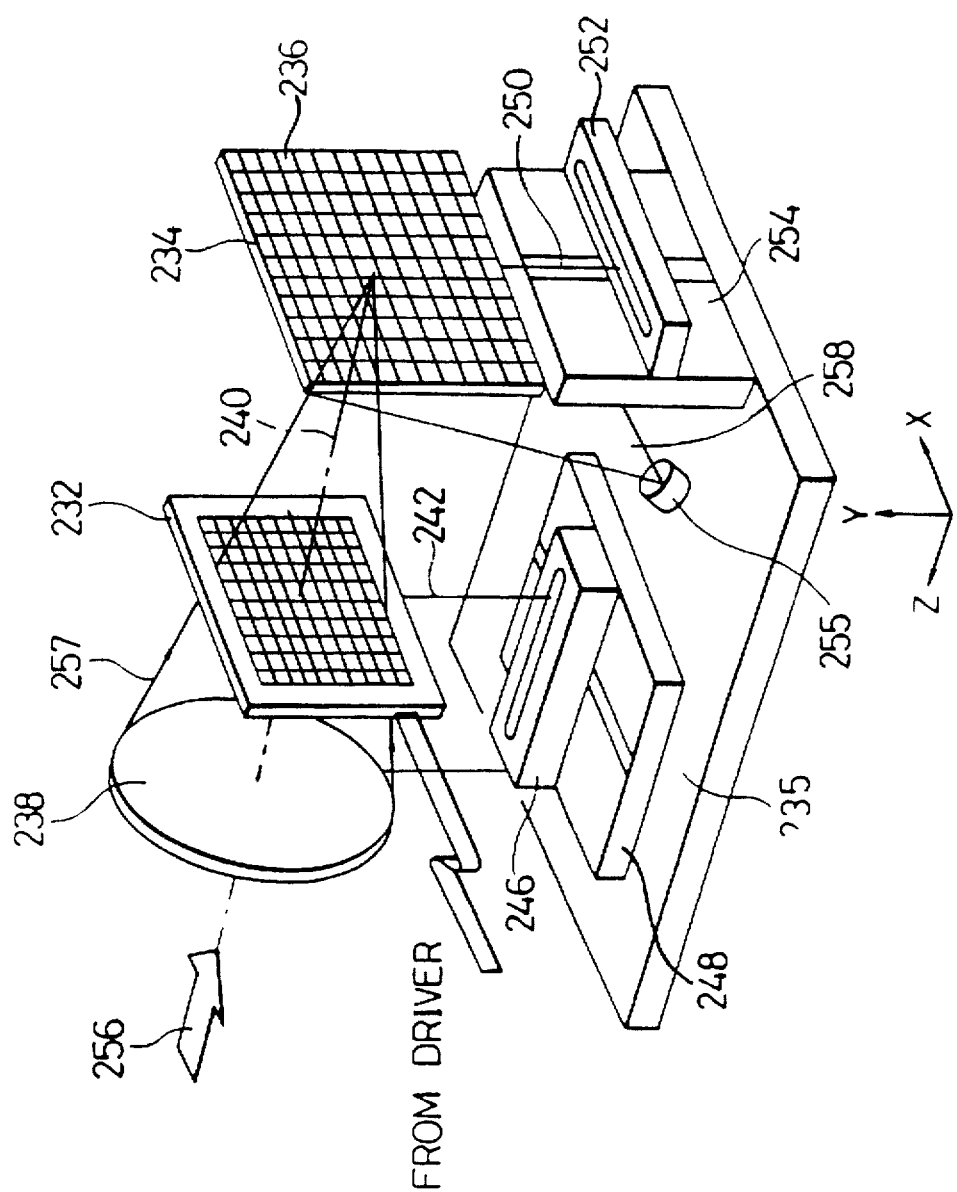
FIG. 41 is an explanatory diagram showing a construction of an exposing apparatus that is used in the exposing step in FIG. 40.

A flowchart of FIG. 40 shows the details of the exposing process shown in step S3 in FIG. 39. For instance, an exposing apparatus as shown in FIG. 41 is used in the exposing process. The exposing apparatus shown in FIG. 41 comprises an image forming lens 238, a liquid crystal display 232, and a hologram dry plate 234. The liquid crystal display 232 is supported by a supporting arm 242 and can be moved in the Z and X directions by a Z stage 246 and an X stage 248 mounted on a base plate 235. The hologram dry plate 234 is supported by an arm 250 and can be moved in the X and Y directions by an X stage 252 and a Y stage 254 over the base plate 235. The image forming lens 238 converges the illumination light onto a micro segment hologram region 236 on the hologram dry plate 234 through the liquid crystal display 232.

Figure 42A:
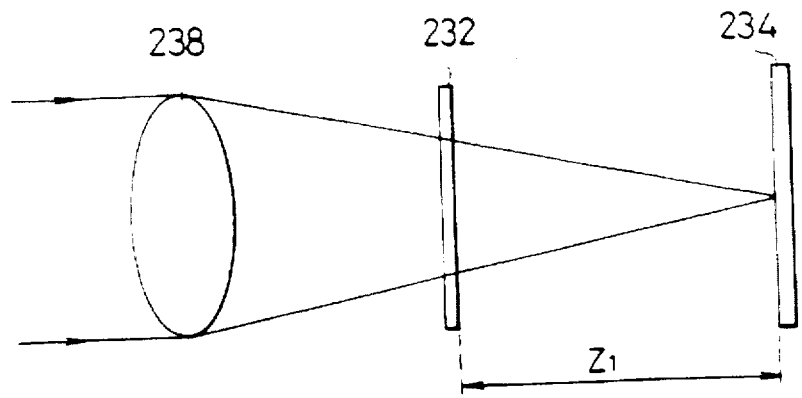
FIGS. 42A to 42C are explanatory diagrams, each showing the multiple exposure of 2-dimensional images in a plurality of zones for one segment hologram region on a hologram dry plate.
Figure 42B:
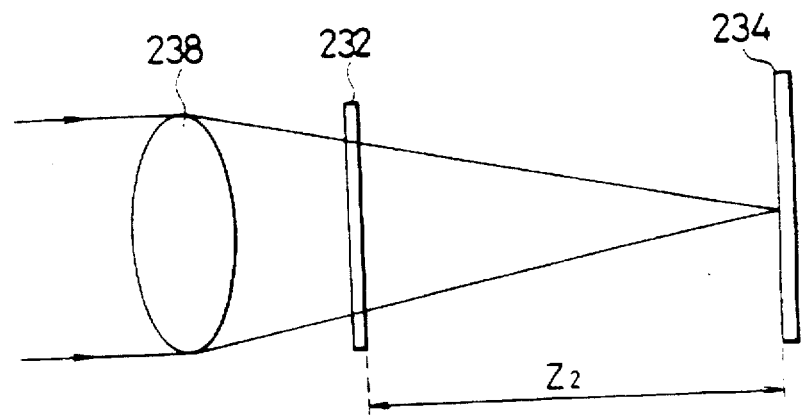
Figure 42C:
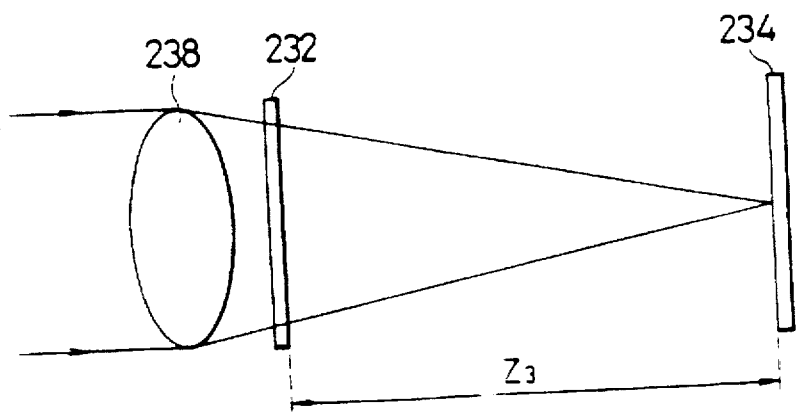

The exposing process by the flowchart of FIG. 40 will now be described with respect to a construction of the apparatus of FIG. 41. First, in step S1, a hologram exposing region is set. Namely, the hologram dry plate 234 is divided into micro regions in a matrix form, thereby setting segment hologram regions 236. Subsequently, a distance in the depth direction of the liquid crystal display 232 is set for the hologram dry plate 234 so as to be equal to a distance $Z_1$ to the zone to be first processed. Subsequently, a special segment hologram region on the hologram dry plate 234 which is exposed for the first time is matched with an optical axis 240 of the image forming lens 238. In this state, the 2-dimensional image corresponding to the segment hologram region set in the liquid crystal display 232 is displayed. A converged light 257 is irradiated to the liquid crystal display 232, thereby converging the 2-dimensional image displayed. At the same time, a reference light 258 which can interfere (which is coherent) with an illuminating light 256 is irradiated by using a beam expander 255. An interference exposure is executed in step S4. In step S5, a check is made to see if the interference exposure of the depth image has been finished or not. The interference exposure is repeated a number of times as many as the number of zones. For example, when there are three zones in the depth direction, as shown in FIGS. 42A, 42B, and 42C, the images corresponding to the zones are displayed while changing the distance of the liquid crystal display 232 from the hologram dry plate 234 to $Z_1$, $Z_2$, and $Z_3$, thereby overlappingly executing the interference exposure three times. When the interference exposure is finished for all of the zones in step S5, the processing routine advances to step S6. The processes in step S1 and subsequent steps are repeated until the processes for all of the exposing regions are finished.

Formation of 2-Dimensional Data Based on Image Pickup Information of Object

A flowchart of FIG. 43 shows processes in a case of forming 3-dimensional data from the 2-dimensional information obtained by photographing an object by a CCD camera or the like in a stereoscopic display method of a hologram, to express a hologram by calculating the phase distribution. In the processing routine, the process to the S1 and a process to input a 2-dimensional image in step S1 and process to form 3-dimensional data from the 2-dimensional image in step S2 differ from those mentioned above. The formation of a depth image, the calculation of a phase distribution, the display of a phase distribution, and the conversion into an optical wave front in step S3 and subsequent steps are substantially the same as those in the embodiment of FIG. 2.

Figure 44:
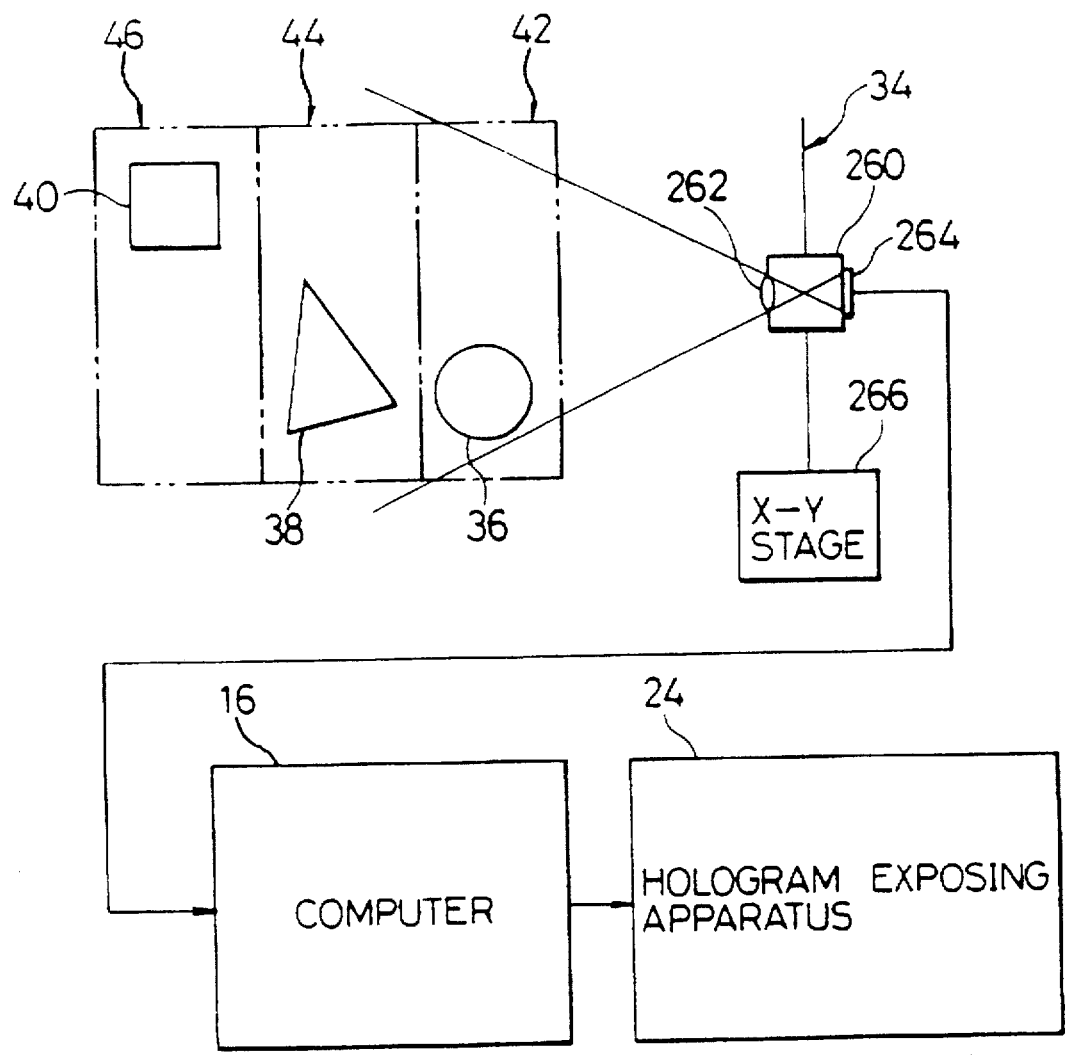
FIG. 44 is an explanatory diagram of a construction of an apparatus to realize the method of FIG. 43.

FIG. 44 shows a process to input a 2-dimensional image in step S1 in FIG. 43. A CCD camera 260 which is driven by, for example, a television system is installed at the position of the hologram forming surface 34. The 2-dimensional images of the objects 36, 38, and 40 existing in the depth direction are photographed by the CCD camera 260 and are supplied to the computer 16. In the CCD camera 260, an image forming lens 262 and an image forming surface 264 are shown. The CCD camera is moved by an XY stage 266 to an arbitrary position on the hologram forming surface 34 and can photograph the objects.

Figure 45:
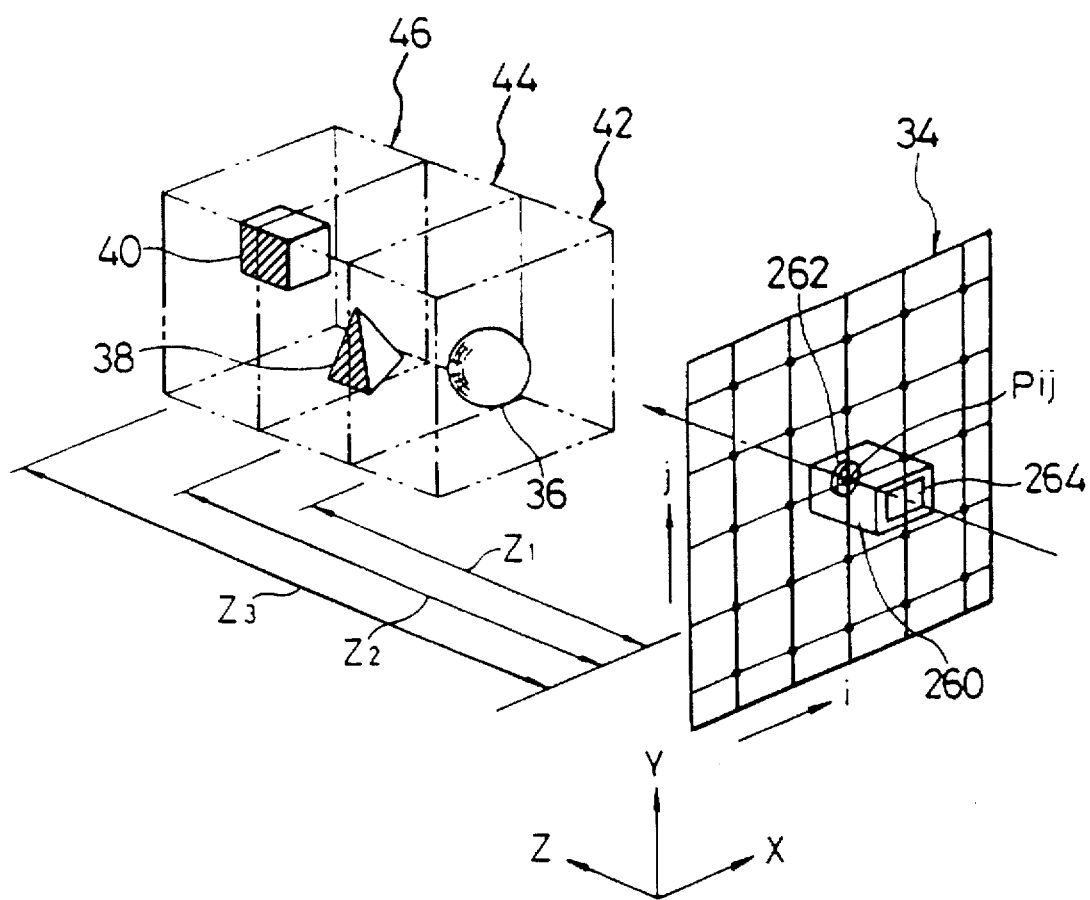
FIG. 45 is an explanatory diagram showing the principle construction for photographing an object.

FIG. 45 shows a method of fetching 2-dimensional images. That is, the objects 36, 38, and 40 each having a solid structure are photographed from positions $P_{ij}$ (i=1, 2, - - -, n; j=1, 2, - - -, n) of a plurality of photographing points set on the hologram forming surface 34 and are fetched as image information. Upon photographing at each of the photographing points $P_{ij}$, the CCD camera 260 can be also installed at the position corresponding to each photographing point. Or, the objects can be photographed at respective positions while moving the single CCD camera 260. In this case, the center of the image forming lens 262 is set to a visual point position Pij (image input position). The direction of the optical axis of the image forming lens 262 when a 2-dimensional image is photographed is set to be always parallel even when the photographing point differs. The lens optical axis can also be always directed to the same object every photographing point. In a manner similar to the conventional holographic stereogram, an interval between the adjacent photographing points $P_{ij}$ is set so that the side surface of an image can be continuously seen when the reconstructed image is observed from different visual points and it is sufficient to set such an interval to about 0.3 to 1 degree as a separation angle. Further, as to the number of photographing points $P_{ij}$, in order to obtain a natural stereoscopic feeling when an object is observed from different visual points, at least hundreds of photographing points are necessary in the horizontal direction and at least tens of photographing points are needed in the vertical direction. In the case where it is difficult to arrange or move the cameras or camera to all of the photographing points, 2-dimensional images are photographed at skipped photographing points and are fetched. It is sufficient that the 2-dimensional images at the photographing points skipped are formed by interpolation image processes. In the interpolation and production of the 2-dimensional image data, it is sufficient to produce new 2-dimensional image data on the basis of the 3-dimensional image data formed from the 2-dimensional image data fetched.

Figure 46:
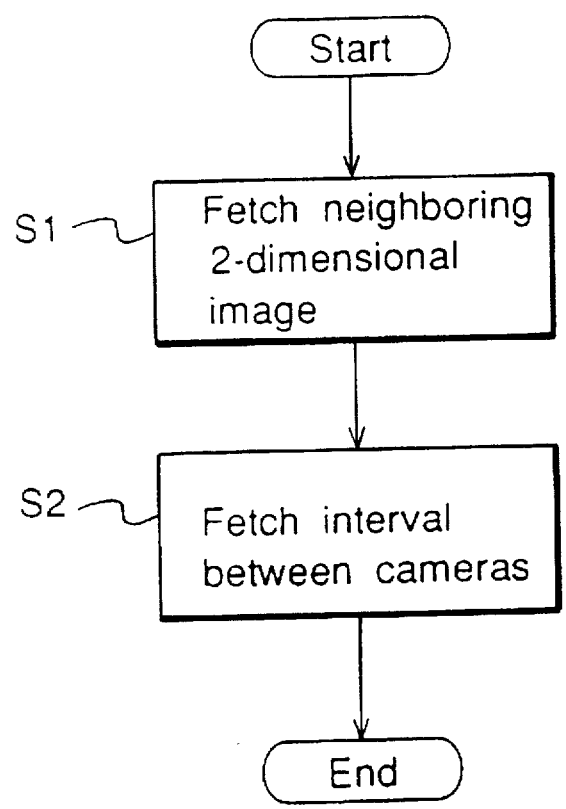
FIG. 46 is a flowchart showing the contents of a step of inputting a 2-dimensional image in FIG. 43.

A flowchart of FIG. 46 shows the details of the inputting process of the 2-dimensional images shown in FIG. 45. That is, in step S1, the 2-dimensional images are fetched by photographing the adjacent 2-dimensional images. In step S2, the photographed camera interval is fetched. The processes in steps S1 and S2 are repeated.

Figure 47:
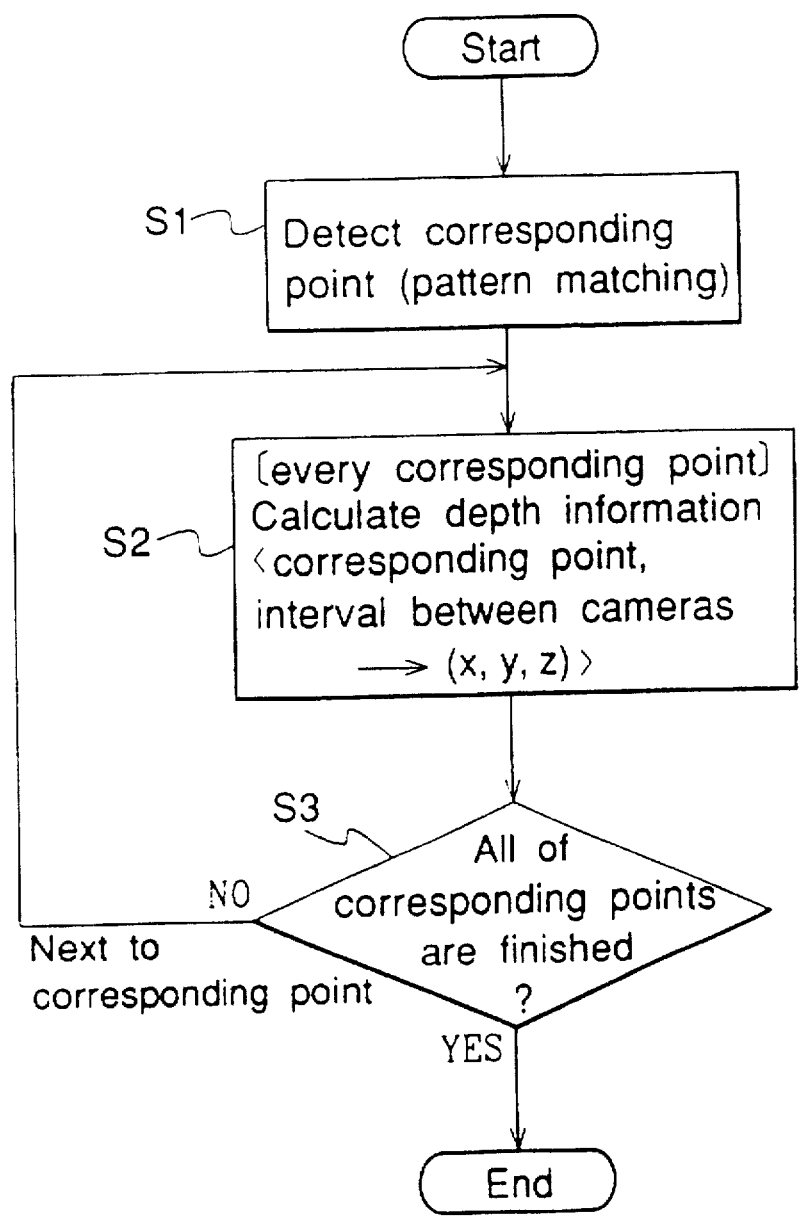
FIG. 47 is a flowchart showing the details of a step of forming 3-dimensional data from the 2-dimensional image in FIG. 43.

A flowchart of FIG. 47 shows the process to form the 3-dimensional data from the extracted 2-dimensional image data shown in step S2 in FIG. 43. Upon formation of the 3-dimensional data in this case, a corresponding point is detected from the 2-dimensional image data by a pattern matching of the image data fetched at two points. The depth information is calculated by using the principle of the triangulation every corresponding point, thereby producing the 3-dimensional data (X, Y, Z) of the corresponding point. The process in step S2 is executed with respect to all of the corresponding points in step S3. In the detection of the corresponding point in step S1, in addition to a method of the observation by two eyes using the 2-dimensional images obtained by photographing at two points, by using a method of the observation by three eyes using the 2-dimensional images obtained by photographing at three points, a precision can be further improved. On the other hand, as a method of directly obtaining depth information without detecting the corresponding point, for example, it is sufficient to measure the distance by a range finder using a laser beam. The processes after the 3-dimensional image data was formed from the 2-dimensional image information photographed by the camera are substantially the same as those in the embodiment of FIG. 1 using the 3-dimensional data of the CAD system.

Figure 48:
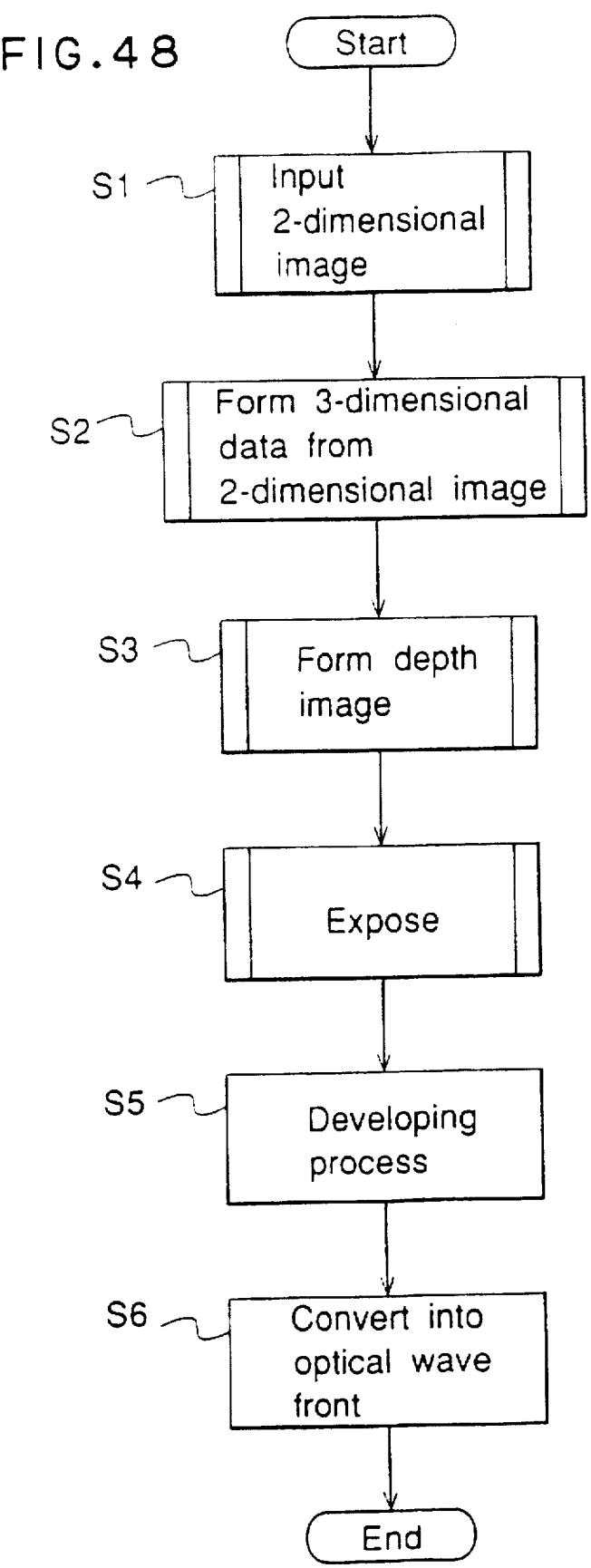
FIG. 48 is a flowchart showing a fundamental processing procedure of the invention to form a hologram by producing 3-dimensional data from the 2-dimensional data obtained by photographing an object.

A flowchart of FIG. 48 shows a hologram forming method and a display of a solid image using the hologram formed, wherein with respect to the embodiment shown in FIG. 39, such that the depth images are formed on the basis of the 3-dimensional data of the CAD system and the hologram dry plate is formed by the multiple exposure such that, 3-dimensional data is produced from the 2-dimensional image information photographed at a number of points by the camera similarly to the case of FIG. 43.

According to the invention as mentioned above, by obtaining a hologram expressing the phase distribution based on the 2-dimensional images divided in the depth direction, a more natural stereoscopic display can be realized as compared with the conventional holographic stereogram.

Since a hologram can be electronically formed from a virtual object by the CAD system and can be stereoscopically displayed, a solid image can be rewritten and displayed in a short time. Further, a color stereoscopic display can be also easily realized.

The invention is not limited to the above embodiments but many variations and modifications are possible within the spirit and scope of the claims of the invention. The invention is also not limited to the numerical values shown in the embodiments.

What is claimed is:

1. A stereoscopic display method, comprising:

a) obtaining 2 dimensional information of a 3 dimensional object by photographing the object;

b) obtaining 3 dimensional information of the object from the 2 dimensional information;

c) mathematically modeling the object from the 3 dimensional information;

d) dividing the modeled object into a plurality of 3 dimensional portions;

e) determining depth data of each of the 3 dimensional portions by measuring distances between a reference position and each of the 3 dimensional portions;

f) formulating projection data to display the 3 dimensional object onto a 2 dimensional hologram forming surface, whereby a third dimension is represented by the depth data;

g) calculating a phase distribution from the projection data;

h) displaying the phase distribution onto the hologram forming surface;

i) displaying a three dimensional image of the object by irradiating a reference light to the displayed phase distribution and by converting the reference light into an optical wave front.

2. A method according to claim 1, wherein said step a) comprises:

i) finely dividing the 2-dimensional information along a depth direction, thereby setting a plurality of photographing positions; and ii) photographing the object at the plurality of photographing positions.

3. A method according to claim 2, wherein said substep ii) includes photographing the object so that the photographing direction is set to the same direction at each of the photographing points.

4. A method according to claim 2, wherein said substep ii) includes photographing the object so that the photographing direction is directed to one predetermined point in each depth region at each of the photographing points.

5. A method according to claim 2, wherein said substep ii) includes arranging image pickup means at each of the photographing points and photographing the object.

6. A method according to claim 2, wherein said substep ii) includes forming interpolated 2-dimensional image information between the plurality of photographing positions from the 2-dimensional image information.

7. A stereoscopic display method, comprising:

a) obtaining 2 dimensional information of a 3 dimensional object by photographing the object;

b) obtaining 3 dimensional information of the object from the 2 dimensional information;

c) mathematically modeling the object from the 3 dimensional information;

d) dividing the modeled object into a plurality of 3 dimensional portions;

e) obtaining 2 dimensional data of the plurality of 3 dimensional portions;

f) obtaining depth data of the plurality of 3 dimensional portions by measuring distances between a reference position and each of the plurality of 3 dimensional portions from the 2 dimensional data;

g) formulating projection data from the 2 dimensional data and the depth data;

h) projecting the projection data onto a 2 dimensional hologram forming surface;

i) calculating a phase distribution from the projection data;

j) projecting the phase distribution onto the hologram forming surface;

k) irradiating a reference light to the projected phase distribution to display a 3 dimensional image of the object.

8. A method for forming a hologram, comprising:

a) obtaining 2 dimensional information of a 3 dimensional object by photographing the object;

b) obtaining 3 dimensional information of the object from the 2 dimensional information;

c) mathematically modeling the object from the 3 dimensional information;

d) dividing the modeled object into a plurality of 3 dimensional portions;

e) determining depth data of each of the 3 dimensional portions by measuring distances between a reference position and each of the 3 dimensional portions;

f) formulating projection data to display the 3 dimensional object onto a 2 dimensional hologram forming surface, whereby a third dimension is represented by the depth data;

g) holographically recording the depth data.

9. A method according to claim 8, wherein said step a) comprises:

i) finely dividing the 2-dimensional information along a depth direction, thereby setting a plurality of photographing positions; and ii) photographing the object at the plurality of photographing positions.

10. A method according to claim 9, wherein said substep ii) includes photographing the object so that the photographing direction is set to the same direction at each of the photographing points.

11. A method according to claim 9, wherein said substep ii) includes photographing the object so that the photographing direction is directed to one predetermined point in each depth region at each of the photographing points.

12. A method according to claim 9, wherein said substep ii) includes moving photographing means to each of the photographing points and photographing the object.

13. A method according to claim 8, wherein said step a) includes i) forming an image of the 2-dimensional information.

14. A stereoscopic display method, comprising:

a) obtaining 2 dimensional information of a 3 dimensional object by photographing the object;

b) obtaining 3 dimensional information of the object from the 2 dimensional information;

c) mathematically modeling the object from the 3 dimensional information;

d) dividing the modeled object into a plurality of 3 dimensional portions;

e) obtaining 2 dimensional data of the plurality of 3 dimensional portions;

f) obtaining depth data of the plurality of 3 dimensional portions by measuring distances between a reference position and each of the plurality of 3 dimensional portions from the 2 dimensional data;

g) formulating projection data from the 2 dimensional data and the depth data;

h) projecting the projection data onto a 2 dimensional hologram forming surface;

i) holographically recording the depth data.

* * * * *